United States Patent
Pal et al.

(10) Patent No.: US 11,249,530 B1
(45) Date of Patent: Feb. 15, 2022

(54) ADAPTIVE VOLTAGE CONTROLLER

(71) Applicant: QUALCOMM Incorporated, San Diego, CA (US)

(72) Inventors: Dipti Ranjan Pal, Irvine, CA (US); Harshat Pant, San Diego, CA (US); Abinash Roy, San Diego, CA (US); Shih-Hsin Jason Hu, San Diego, CA (US); Keith Alan Bowman, Morrisville, NC (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/105,253

(22) Filed: Nov. 25, 2020

(51) Int. Cl.
*G06F 1/24* (2006.01)
*G06F 1/30* (2006.01)
*G06F 1/324* (2019.01)
*G05F 3/24* (2006.01)
*G05F 1/595* (2006.01)

(52) U.S. Cl.
CPC .............. *G06F 1/305* (2013.01); *G05F 1/595* (2013.01); *G05F 3/24* (2013.01); *G06F 1/324* (2013.01)

(58) Field of Classification Search
None
See application file for complete search history.

(56) References Cited

U.S. PATENT DOCUMENTS

| | | | |
|---|---|---|---|
| 6,487,668 B2 | 11/2002 | Thomas et al. | |
| 6,586,971 B1 | 7/2003 | Naffziger et al. | |
| 6,762,629 B2 | 7/2004 | Tam et al. | |
| 6,922,111 B2 | 7/2005 | Kurd et al. | |
| 6,995,621 B1 | 2/2006 | Culler | |
| 8,269,544 B2 | 9/2012 | Greenhill et al. | |
| 8,350,589 B2 | 1/2013 | Chlipala et al. | |
| 8,669,794 B2 | 3/2014 | Park et al. | |
| 8,710,913 B2 * | 4/2014 | Baumann | H03K 19/00384 327/540 |
| 8,928,385 B2 | 1/2015 | Kim et al. | |
| 9,087,615 B2 | 7/2015 | Cordero et al. | |
| 9,244,515 B2 * | 1/2016 | Kawasaki | G06F 1/3203 |

(Continued)

FOREIGN PATENT DOCUMENTS

WO    2015161890 A1    10/2015

OTHER PUBLICATIONS

Bowman K.A., et al., "A 16 nm All-Digital Auto-Calibrating Adaptive Clock Distribution for Supply Voltage Droop Tolerance Across a Wide Operating Range", IEEE Journal of Solid-State Circuits, Jan. 2016, vol. 51, No. 1, XP01159641, pp. 8-17.

(Continued)

*Primary Examiner* — Thomas J. Hiltunen
(74) *Attorney, Agent, or Firm* — Loza & Loza, LLP

(57) ABSTRACT

In certain aspects, a system includes a voltage controller, wherein the voltage controller includes switches coupled between a voltage supply rail and an output of the voltage controller, each of the switches having a control input, and a control circuit coupled to the control inputs of the switches. The system also includes a timing circuit coupled to the control circuit, wherein the timing circuit includes a delay line, and flops, each of the flops having an input and an output, wherein the input of each of the flops is coupled to a respective node on the delay line, and the outputs of the flops are coupled to the control circuit.

24 Claims, 13 Drawing Sheets

(56) References Cited

U.S. PATENT DOCUMENTS

| | | | |
|---|---|---|---|
| 9,323,320 | B2 | 4/2016 | Fitzpatrick et al. |
| 9,413,344 | B2* | 8/2016 | Bowman ................ G06F 1/10 |
| 9,503,068 | B1* | 11/2016 | DiBene, II ............ G01R 19/04 |
| 9,628,089 | B1 | 4/2017 | Jain et al. |
| 9,842,633 | B2 | 12/2017 | King |
| 10,020,931 | B2 | 7/2018 | Abdelmoneum et al. |
| 10,587,250 | B2* | 3/2020 | Hanke ................ G06F 1/324 |
| 10,587,253 | B1* | 3/2020 | Huang ................ G06F 1/305 |
| 10,635,159 | B2* | 4/2020 | Kolla ................ G06F 1/324 |
| 2002/0190283 | A1* | 12/2002 | Seno ................ H03K 5/135 |
| | | | 257/275 |
| 2004/0183613 | A1 | 9/2004 | Kurd et al. |
| 2005/0138444 | A1 | 6/2005 | Gaskins |
| 2012/0017106 | A1 | 1/2012 | Curren et al. |
| 2012/0187991 | A1 | 7/2012 | Sathe et al. |
| 2014/0070878 | A1* | 3/2014 | Kawasaki ............ G06F 1/3203 |
| | | | 327/543 |
| 2016/0072491 | A1 | 3/2016 | Bowman et al. |
| 2016/0282889 | A1* | 9/2016 | Mahajan ................ G05F 1/575 |
| 2018/0183417 | A1 | 6/2018 | Ho et al. |
| 2021/0240142 | A1* | 8/2021 | Bang ................ G05F 1/46 |

OTHER PUBLICATIONS

QUALCOMM: "Search Request for 205246—Adaptive Core Voltage Controller for Core-Level Dynamic Voltage-Frequency Scaling", 9 Pages.

* cited by examiner

ADAPTIVE VOLTAGE CONTROLLER

BACKGROUND

Field

Aspects of the present disclosure relate generally to power management, and more particularly, to an adaptive voltage controller.

Background

A circuit (e.g., a processor) may receive power from an input supply rail. In some cases, it is desirable to operate the circuit at a lower voltage than the supply voltage on the input supply rail (e.g., to reduce power consumption of the circuit). In these cases, a voltage controller coupled between the input supply rail and the voltage to the circuit may be used to set the voltage of the circuit to a voltage that is lower than the input supply voltage.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to a system. The system includes a voltage controller, wherein the voltage controller includes switches coupled between a voltage supply rail and an output of the voltage controller, each of the switches having a control input, and a control circuit coupled to the control inputs of the switches. The system also includes a timing circuit coupled to the control circuit, wherein the timing circuit includes a delay line, and flops, each of the flops having an input and an output, wherein the input of each of the flops is coupled to a respective node on the delay line, and the outputs of the flops are coupled to the control circuit.

A second aspect relates to a method for controlling a voltage of a circuit. The method includes receiving a timing margin signal and a reference signal, comparing the timing margin signal with the reference signal, and adjusting a number of switches that are turned on between a supply rail and the circuit based on the comparison.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
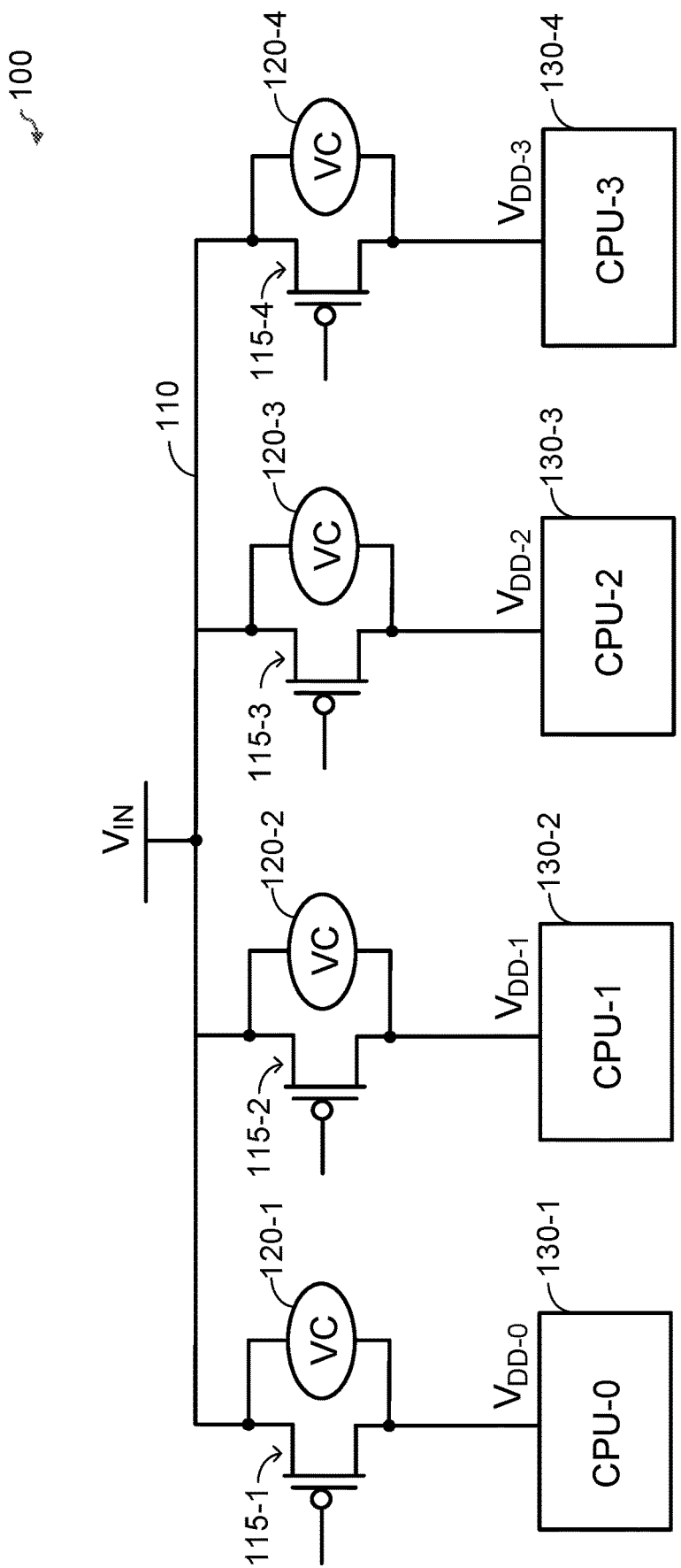
FIG. 1 shows an example of a multi-core system according to certain aspects of the present disclosure.

FIG. 1 shows an example of a multi-core system 100 (also referred to as a multi-core processor) according to certain aspects. The multi-core system 100 includes multiple central processing unit (CPU) cores 130-1 to 130-4, in which each core 130-1 to 130-4 can operate at one of multiple selectable performance modes. The system 100 may employ dynamic voltage-frequency scaling (DVFS) in which the frequency and voltage of each core is dynamically scaled based on the current performance mode of the core. For example, the voltage and the frequency may be higher for a higher performance mode than a lower performance mode.

In the example in FIG. 1, the cores 130-1 to 130-4 operate on a common (i.e., shared) supply rail 110. In this example, the system 100 includes head switches 115-1 to 115-4 where each of the head switches 115-1 to 115-4 is coupled between the common supply rail 110 and a respective one of the cores 130-1 to 130-4. In the example in FIG. 1, each head switch 115-1 to 115-4 is implemented with one or more transistors (e.g., one or more p-type field effect transistors (PFETs)).

The system 100 also includes voltage controllers 120-1 to 120-4 where each of the voltage controllers 120-1 to 120-4 is coupled between the common supply rail 110 and a respective one of the cores 130-1 to 130-4. As discussed further below, each voltage controller 120-1 to 120-4 is configured to set the voltage of the respective core 130-1 to 130-4 (e.g., based on the performance mode of the core). Thus, the voltage controllers 120-1 to 120-4 allow the voltages of the cores 130-1 to 130-4 to be independently set (i.e., scaled) even though they share the supply rail 110. For example, the voltage of a core may be set at a lower voltage for a lower performance mode to save power and may be set at a higher voltage for a higher performance mode to enable the core to operate at the higher performance mode.

Although FIG. 1 shows each voltage controller 120-1 to 120-4 coupled in parallel with the head switch 115-1 to 115-4 of the respective core 130-1 to 130-4, it is to be appreciated that this need not be the case. For example, in some implementations, each head switch 115-1 to 115-4 may be incorporated in the voltage controller 120-1 to 120-4 of the respective core 130-1 to 130-4, as discussed further below.

The supply voltage $V_{IN}$ on the common supply rail 110 may be provided by a power management integrated circuit (PMIC) coupled to the supply rail 110. In this example, the PMIC (not shown) may set the supply voltage $V_{IN}$ based on the core operating at the highest performance mode. This is because the core operating at the highest performance mode requires the highest voltage. For example, core 130-1 (labeled "CPU-0") may operate at the highest performance mode (e.g., "turbo" mode) while the other cores 130-2 to 130-4 (labeled "CPU-1" to "CPU-3") may operate at lower performance modes. In this example, the supply voltage $V_{IN}$ on the common supply rail 110 is set based on the voltage needed by core 130-1 to operate at the highest performance mode. In this case, the head switch 115-1 for core 130-1 is turned on to provide core 130-1 with the supply voltage $V_{IN}$.

Because the other cores 130-2 to 130-4 operate at lower performance modes than core 130-1, the other cores 130-2 to 130-4 can be operated at voltages lower than the supply voltage $V_{IN}$ to reduce the power consumption of these cores. In this regard, each of the voltage controllers 120-2 to 120-4 sets the voltage of the respective core 130-2 to 130-4 to a respective voltage below $V_{IN}$ based on the current performance mode of the respective core 130-2 to 130-4. In this case, the head switches 115-2 to 115-4 may be turned off since the voltages of cores 130-2 to 130-4 are controlled by the respective voltage controllers 120-2 to 120-4.

In the current state of the art, a voltage controller is implemented with a low-dropout (LDO) voltage regulator. An LDO regulator may be analog or digital.

Figure 2:
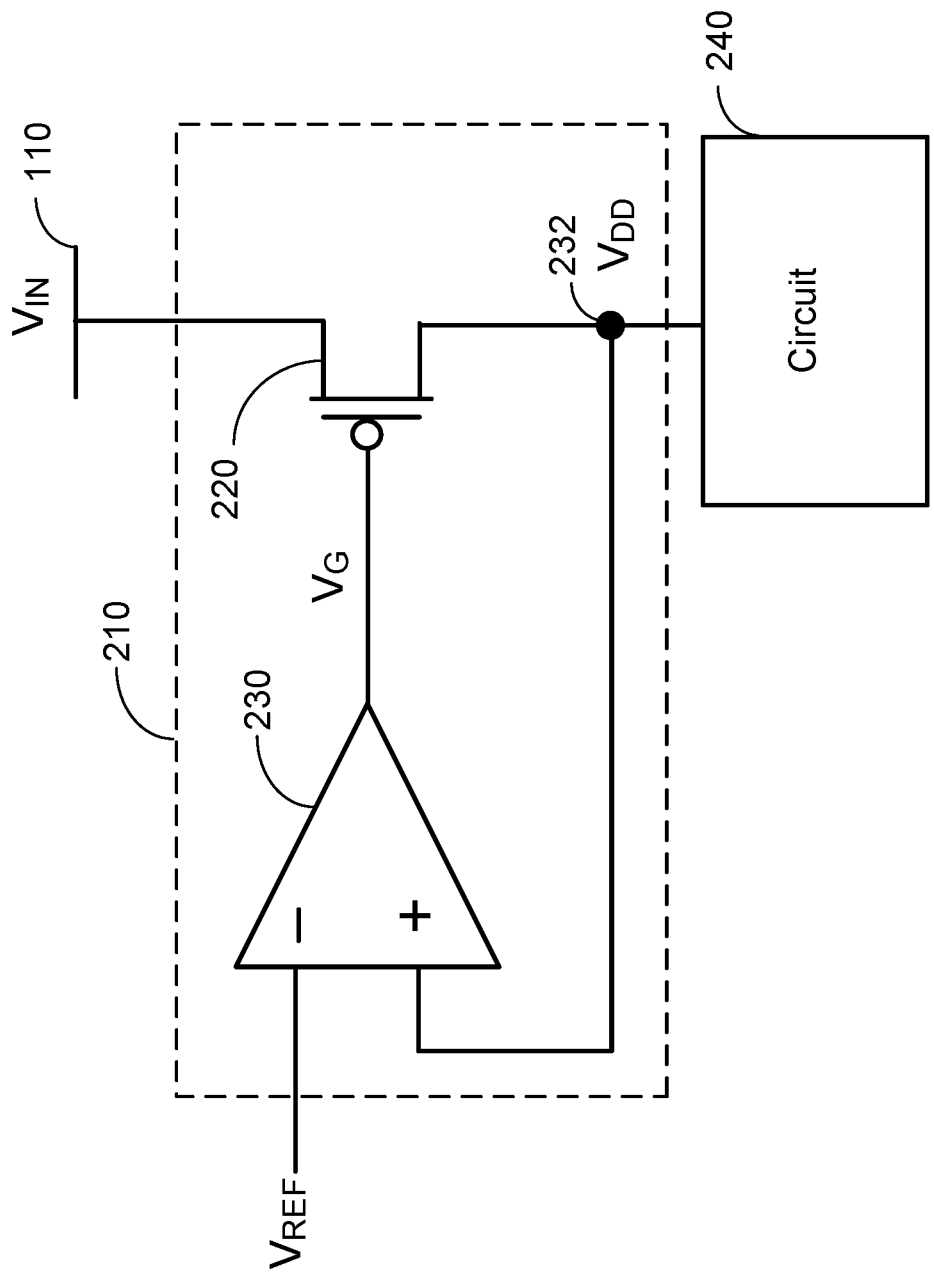
FIG. 2 shows an example of a voltage controller including an analog low-dropout (LDO) regulator according to certain aspects of the present disclosure.

FIG. 2 shows an example of a voltage controller implemented with an analog LDO regulator 210. The LDO regulator 210 includes a pass transistor 220 (e.g., PFET) coupled between the common supply rail 110 and a circuit 240 (e.g., respective one of the cores 130-1 to 130-4). The LDO regulator 210 also includes an error amplifier 230 with an output coupled to the gate of the pass transistor 220, a minus input coupled to a reference voltage $V_{REF}$, and a plus input coupled to the output 232 of the LDO regulator 210, which provides the voltage $V_{DD}$ to the circuit 240. In operation, the amplifier 230 adjusts the gate voltage $V_G$ of the pass transistor 220 in a direction that reduces the difference (i.e., error) between the reference voltage $V_{REF}$ and the voltage $V_{DD}$, which forces the voltage $V_{DD}$ to be approximately equal to the reference voltage $V_{REF}$. Thus, in this example, the voltage $V_{DD}$ is set to a desired voltage for the circuit 240 by setting the reference voltage $V_{REF}$ accordingly. Note that the head switch for the circuit 240 is not shown in FIG. 2.

A challenge with implementing a voltage controller with an analog LDO regulator is that analog LDO regulators are complex and difficult to scale with technology. Also, analog LDO regulators require a large dropout voltage, which reduces the operating range of the voltage $V_{DD}$.

Figure 3:
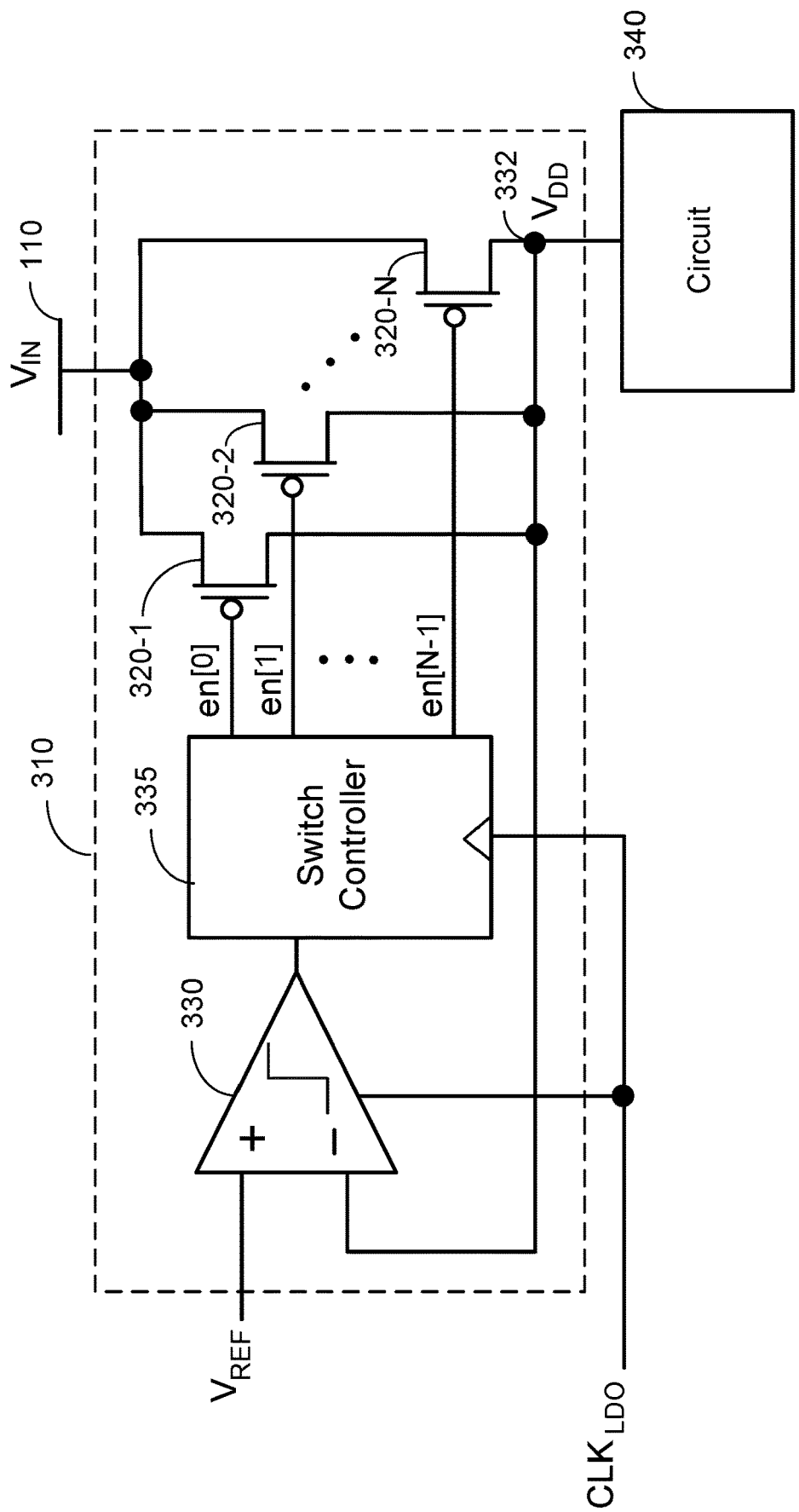
FIG. 3 shows an example of a voltage controller including a digital LDO regulator according to certain aspects of the present disclosure.

FIG. 3 shows an example of a voltage controller implemented with a digital LDO regulator 310. The LDO regulator 310 includes an array of switches 320-1 to 320-N (e.g., PFET) coupled between the common supply rail 110 and a circuit 340 (e.g., respective one of the cores 130-1 to 130-4). The LDO regulator 310 also includes a voltage comparator 330 and a switch controller 335, which may be clocked by clock signal $CLK_{LDO}$. The voltage comparator 330 compares the reference voltage $V_{REF}$ with the voltage at the output 332 of the LDO regulator 310, and outputs a compare signal to the switch controller 335 based on the comparison. The compare signal indicates whether the voltage $V_{DD}$ is less than or greater than the reference voltage $V_{REF}$. The switch controller 335 controls the number of the switches 320-1 to 320-N that are turned on (i.e., enabled) based on the compare signal. More particularly, the switch controller 335 adjusts the number of the switches 320-1 to 320-N that are turned on (i.e., enabled) in a direction that reduces the difference (i.e., error) between the voltage $V_{DD}$ and the reference voltage $V_{REF}$.

A digital LDO regulator has one or more advantages over an analog LDO regulator. For example, a digital LDO regulator may scale more easily with technology than an analog LDO regulator, enable lower $V_{DD}$ for lower voltage operation than an analog LDO regulator, and/or have a smaller dropout voltage than an analog LDO. However, a challenge with implementing a voltage controller with a digital LDO regulator is that a digital LDO regulator typically has a slow response time compared with an analog LDO, resulting in large magnitude voltage droops in the output voltage that degrade processor performance.

Figure 4:
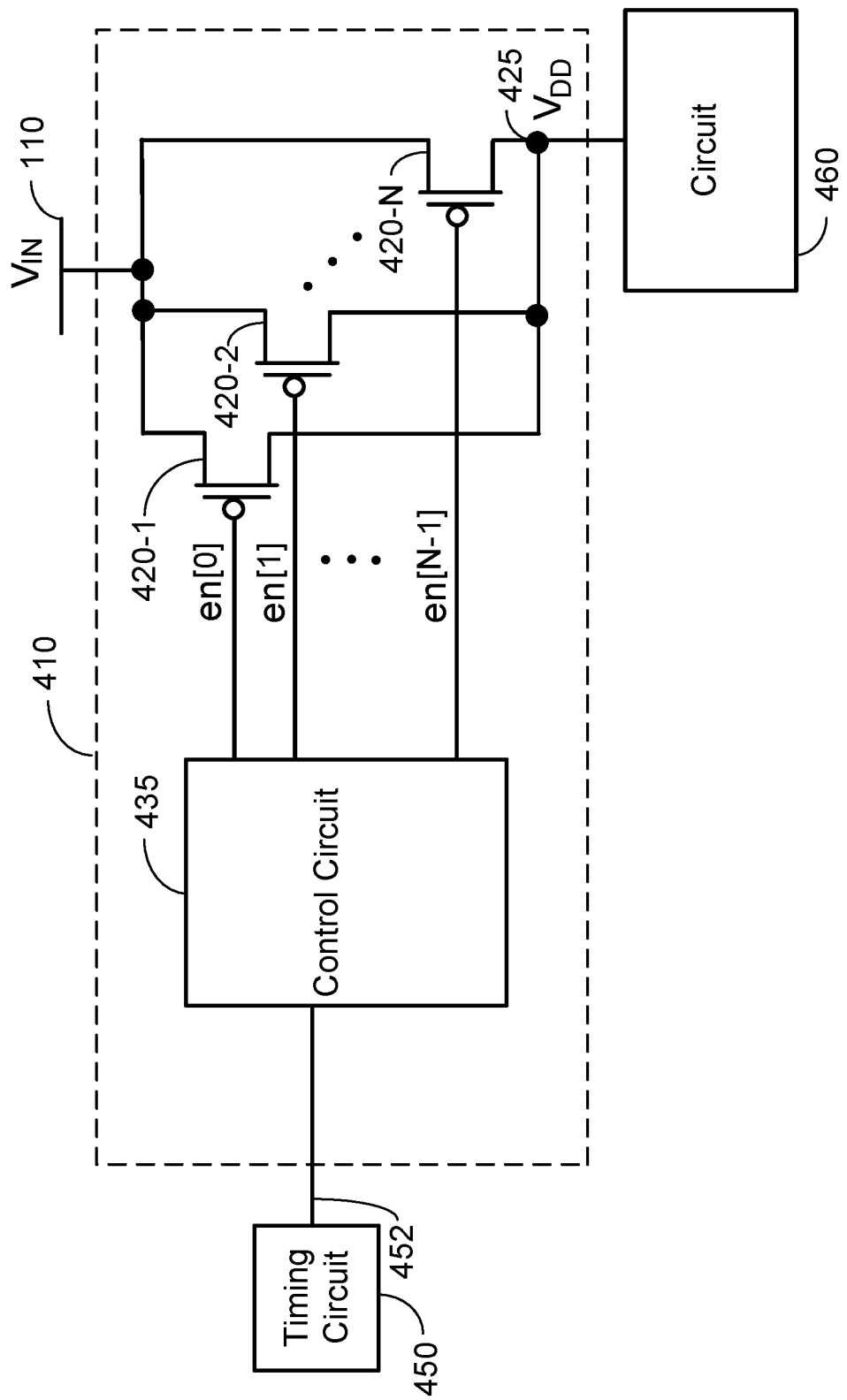
FIG. 4 shows an example of a voltage controller according to certain aspects of the present disclosure.

FIG. 4 shows an exemplary voltage controller 410 according to aspects of the present disclosure. The voltage controller 410 is coupled between the supply rail 110 and a circuit 460. The circuit 460 may include a CPU core (e.g., one of the CPU cores 130-1 to 130-4), a digital signal processor, a video processor, or another type of processor. The voltage controller 410 is configured to control the voltage $V_{DD}$ provided to the circuit 460.

The voltage controller 410 includes an array of switches 420-1 to 420-N coupled between the supply rail 110 and the output 425 of the voltage controller 410, which is coupled to the circuit 460 (e.g., CPU core). In certain aspects, the switches 420-1 to 420-N may be implemented with switches in a head switch (e.g., one of the head switches 115-1 to 115-4). For example, the head switch may be a global distributed head switch (GDHS) including multiple switches coupled in parallel between the supply rail 110 and the circuit 460. In this example, the switches 420-1 to 420-N may be implemented with the switches of the GDHS. An advantage of this example is that the voltage controller 410 may control the on/off states of existing switches in the GDHS to control the voltage $V_{DD}$ instead of using separate switches, thereby reducing area and cost. Thus, in this example, the head switch is incorporated into the voltage controller 410.

For the case where the circuit 460 is to receive the supply voltage $V_{IN}$, the voltage controller 410 may turn on all of the switches 420-1 to 420-N to minimize the resistance between the supply rail 110 and the circuit 460. This may be done, for example, when the circuit 460 is a CPU core in a multi-core system (e.g., multi-core system 100), and the CPU core operates at the highest performance mode in the multi-core system. Cases where the voltage $V_{DD}$ of the circuit 460 is below the supply voltage $V_{IN}$ are discussed further below.

The voltage controller 410 also includes a control circuit 435. The control circuit 435 is coupled to the control inputs of the switches 420-1 to 420-N, and controls the on/off state of each switch 420-1 to 420-N via a respective control signal (labeled "en[0]" to "en[N−1]"). For the example where each of the switches 420-1 to 420-N is implemented with a respective transistor (e.g., PFET), the control input of each switch is located at the gate of the respective transistor. In the example in FIG. 4, each switch 420-1 to 420-N is implemented with a respective PFET. In this example, the control circuit 435 may turn on a switch by setting the voltage of the respective control signal low (e.g., approximately ground) and turn off a switch by setting the voltage of the respective control signal high (e.g., approximately $V_{IN}$). It is to be appreciated that a switch may be implemented with more than one transistor (e.g., multiple transistors in parallel).

The control circuit 435 is configured to adjust the voltage $V_{DD}$ at the output 425 of the voltage controller 410 by controlling the number of the switches 420-1 to 420-N (e.g., switches in a GDHS) that are turned on (i.e., enabled). More particularly, the voltage controller 410 increases the voltage $V_{DD}$ by increasing the number of the switches 420-1 to 420-N that are turned on (i.e., enabled). Turning on more switches 420-1 to 420-N increases the voltage $V_{DD}$ for a given load current by decreasing the resistance between the supply rail 110 and the circuit 460. The voltage controller 410 decreases the voltage $V_{DD}$ by decreasing the number of the switches 420-1 to 420-N that are turned on (i.e., increasing the number of the switches 420-1 to 420-N that are turned off). Turning off more switches 420-1 to 420-N decreases the voltage $V_{DD}$ for a given load current by increasing the resistance between the supply rail 110 and the circuit 460.

In the example in FIG. 4, the control circuit 435 is coupled to a timing circuit 450. The timing circuit 450 is configured to generate a timing margin signal indicating a timing margin for the circuit 460 and output the timing margin signal at an output 452 of the timing circuit 450, which is coupled to the control circuit 435. An exemplary implementation of the timing circuit 450 is discussed below with reference to FIG. 6.

In operation, the control circuit 435 compares the timing margin indicated by the timing margin signal with a target timing margin. The control circuit 435 then adjusts the voltage $V_{DD}$ based on the comparison in a direction that reduces the difference (i.e., error) between the timing margin indicated by the timing margin signal and the target timing margin. For example, if the timing margin indicated by the timing margin signal is greater than the target timing margin, then the control circuit 435 decreases the voltage $V_{DD}$ to the circuit 460 by decreasing the number of the switches 420-1 to 420-N that are turned on (i.e., increasing the number of the switches 420-1 to 420-N that are turned off). The decrease in the voltage $V_{DD}$ decreases the timing margin for the circuit 460, which reduces the difference between the timing margin indicated by the timing margin signal and the target timing margin in this case. If the timing margin indicated by the timing margin signal is less than the timing margin, then the control circuit 435 increases the voltage $V_{DD}$ to the circuit 460 by increasing the number of the switches 420-1 to 420-N that are turned on. The increase in the voltage $V_{DD}$ increases the timing margin for the circuit 460, which reduces the difference between the timing margin indicated by the timing margin signal and the target timing margin in this case.

Thus, in this example, the voltage controller 410 adjusts the voltage $V_{DD}$ to the circuit 460 (i.e., CPU core) in a direction that reduces the difference (i.e., error) between the timing margin for the circuit 460 and the target timing margin. In other words, the voltage controller 410 adjusts the voltage $V_{DD}$ to maintain the timing margin for the circuit 460 at or close to the target timing margin. Thus, unlike a traditional LDO regulator (e.g., LDO regulator 210 or 310), the voltage controller 410 does not compare the voltage $V_{DD}$ with a reference voltage $V_{REF}$ to adjust the voltage $V_{DD}$.

Figure 5:
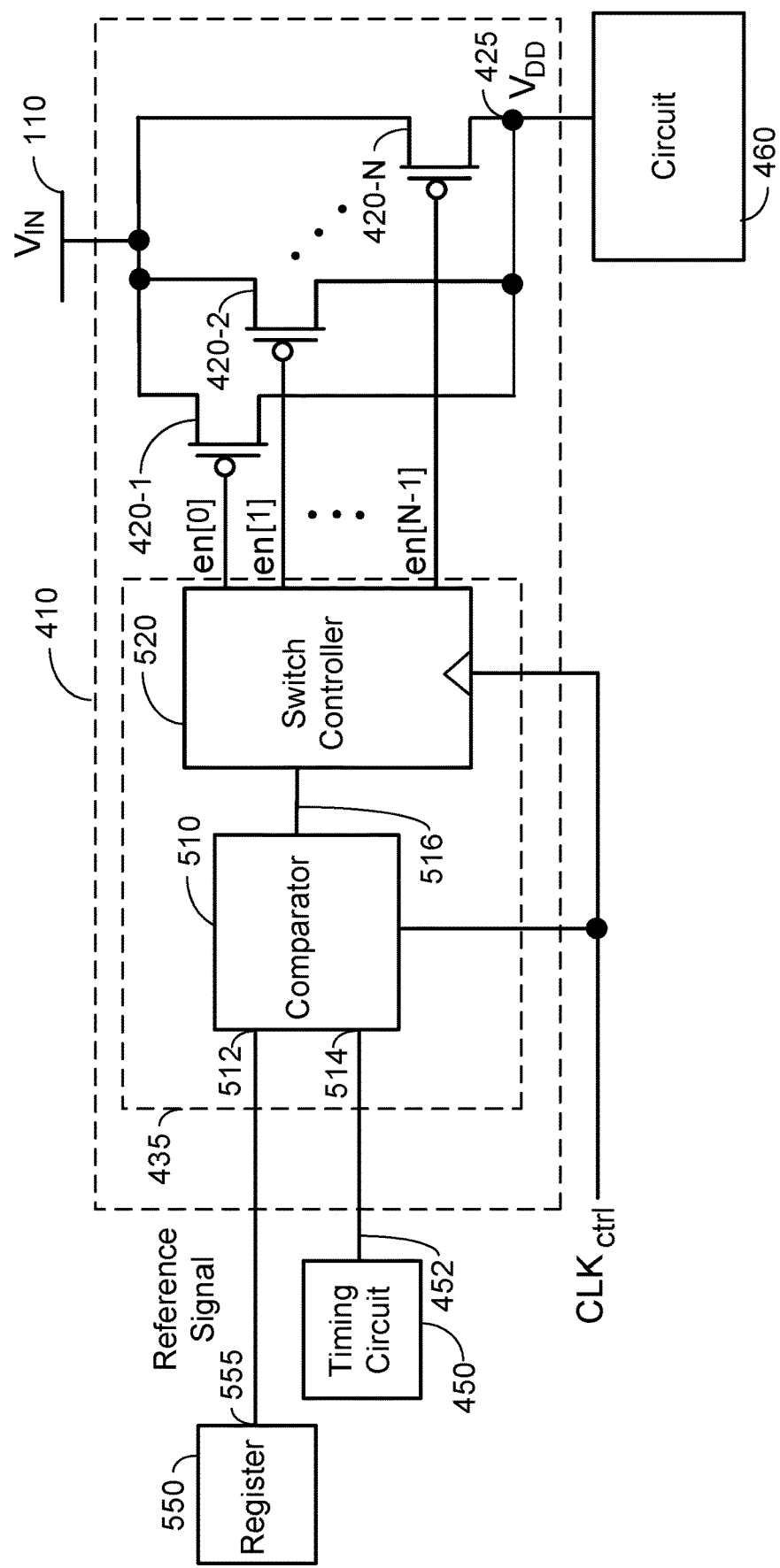
FIG. 5 shows an exemplary implementation of a control circuit according to certain aspects of the present disclosure.

FIG. 5 shows an exemplary implementation of the control circuit 435 according to certain aspects. In this example, the control circuit 435 includes a comparator 510 and a switch controller 520. The switch controller 520 is coupled to the control inputs of the switches 420-1 to 420-N. The switch controller 520 is configured to control the on/off state of each switch 420-1 to 420-N via the respective control signal (labeled "en[0]" to "en[N−1]") based on a compare signal from the comparator 510, as discussed further below. For the example where each of the switches 420-1 to 420-N is implemented with a respective transistor (e.g., PFET), the control input of each switch is located at the gate of the respective transistor. Thus, in this example, the switch controller 520 is coupled to the gates of the transistors (e.g., PFETs) implementing the switches 420-1 to 420-N.

The comparator 510 has a first input 512, a second input 514, and an output 516. The first input 512 of the comparator 510 is configured to receive a reference signal indicating the target timing margin. The second input 514 of the comparator 510 is coupled to the output 452 of the timing circuit 450 and is configured to receive the timing margin signal from the timing circuit 450. The output 516 of the comparator 510 is coupled to the switch controller 520.

In operation, the comparator 510 compares the timing margin signal with the reference signal and generates a compare signal based on the comparison. The compare signal may indicate whether the timing margin signal is less than or greater than the reference signal. In some implementations, the compare signal may also indicate the magnitude of the difference between the timing margin signal and the reference signal. In this example, the timing margin signal may be considered greater than the reference signal when the timing margin indicated by the timing margin signal is greater than the target timing margin indicated by the reference signal, and the timing margin signal may be considered less than the reference signal when the timing margin indicated by the timing margin signal is less than the target timing margin indicated by the reference signal.

The switch controller 520 receives the compare signal from the comparator 510 and adjusts the voltage $V_{DD}$ based on the compare signal in a direction that reduces the difference (i.e., error) between the timing margin signal from the timing circuit 450 and the reference signal. For example, if the timing margin signal is greater than the reference signal, then the switch controller 520 decreases the voltage $V_{DD}$ to the circuit 460 by decreasing the number of the switches 420-1 to 420-N that are turned on. The decrease in the voltage $V_{DD}$ decreases the timing margin for the circuit 460, which reduces the difference between the timing margin signal and the reference signal in this case. If the timing margin signal is less than the reference signal, then the switch controller 520 increases the voltage $V_{DD}$ to the circuit 460 by increasing the number of the switches 420-1 to 420-N that are turned on. The increase in the voltage $V_{DD}$ increases the timing margin for the circuit 460, which reduces the difference between the timing margin signal and the reference signal in this case. Thus, in this example, the switch controller 520 adjusts the voltage $V_{DD}$ to the circuit 460 (i.e., CPU core) in a direction that reduces the difference (i.e., error) between the timing margin for the circuit 460 and the target timing margin.

In the example in FIG. 5, the comparator 510 and the switch controller 520 receive a clock signal $CLK_{ctrl}$ for timing operations of the comparator 510 and the switch controller 520. In one example, for every m cycles of the clock signal $CLK_{ctrl}$, the comparator 510 compares the timing margin signal with the reference signal and outputs a compare signal to the switch controller 520 based on the comparison. Also, for every m cycles of the clock signal $CLK_{ctrl}$, the switch controller 520 receives the compare signal from the comparator 510 and adjusts the number of the switches 420-1 to 420-N that are turned on (e.g., enabled) based on the compare signal. In this example, m may be one or more.

As discussed above, the switch controller 520 receives the compare signal from the comparator 510 and adjusts the number of switches 420-1 to 420-N that are turned on (e.g., enabled) based on the compare signal. In one example, the switch controller 520 may adjust the number of switches 420-1 to 420-N that are turned on one at a time. In this example, if the compare signal indicates that the timing margin signal is greater than the reference signal, then the switch controller 520 turns off one of the switches 420-1 to 420-N that is turned on in order to decrease the number of switches 420-1 to 420-N that are turned on by one. If the compare signal indicates that the timing margin signal is less than the reference signal, then the switch controller 520 turns on one of the switches 420-1 to 420-N that is turned off in order to increase the number of switches 420-1 to 420-N that are turned on by one. In this example, the switch controller 520 may adjust the number of switches 420-1 to 420-N that are turned on each time the comparator 510 updates the compare signal, which may occur every m cycles of the clock signal $CLK_{ctrl}$ where m may be one or more.

However, it is to be appreciated that the present disclosure is not limited to the above example. In one example, the compare signal from the comparator 510 may also indicate the magnitude of the difference between the timing margin signal and the reference signal. In this example, the switch controller 520 may turn on or turn off more than one switch at a time depending on the magnitude of the difference between the timing margin signal and the reference signal. For example, if the compare signal indicates that the timing margin signal is greater than the reference signal, then the switch controller 520 may turn off k of the switches 420-1 to 420-N to decrease the number of the switches 420-1 to 420-N that are turned on by k. If the compare signal indicates that the timing margin signal is less than the reference signal, then the switch controller 520 may turn on k of the switches 420-1 to 420-N to increase the number of the switches 420-1 to 420-N that are turned on by k. In this example, k depends on the magnitude of the difference between the timing margin signal and the reference signal where k may be larger for a larger magnitude and smaller for a smaller magnitude.

Figure 6:
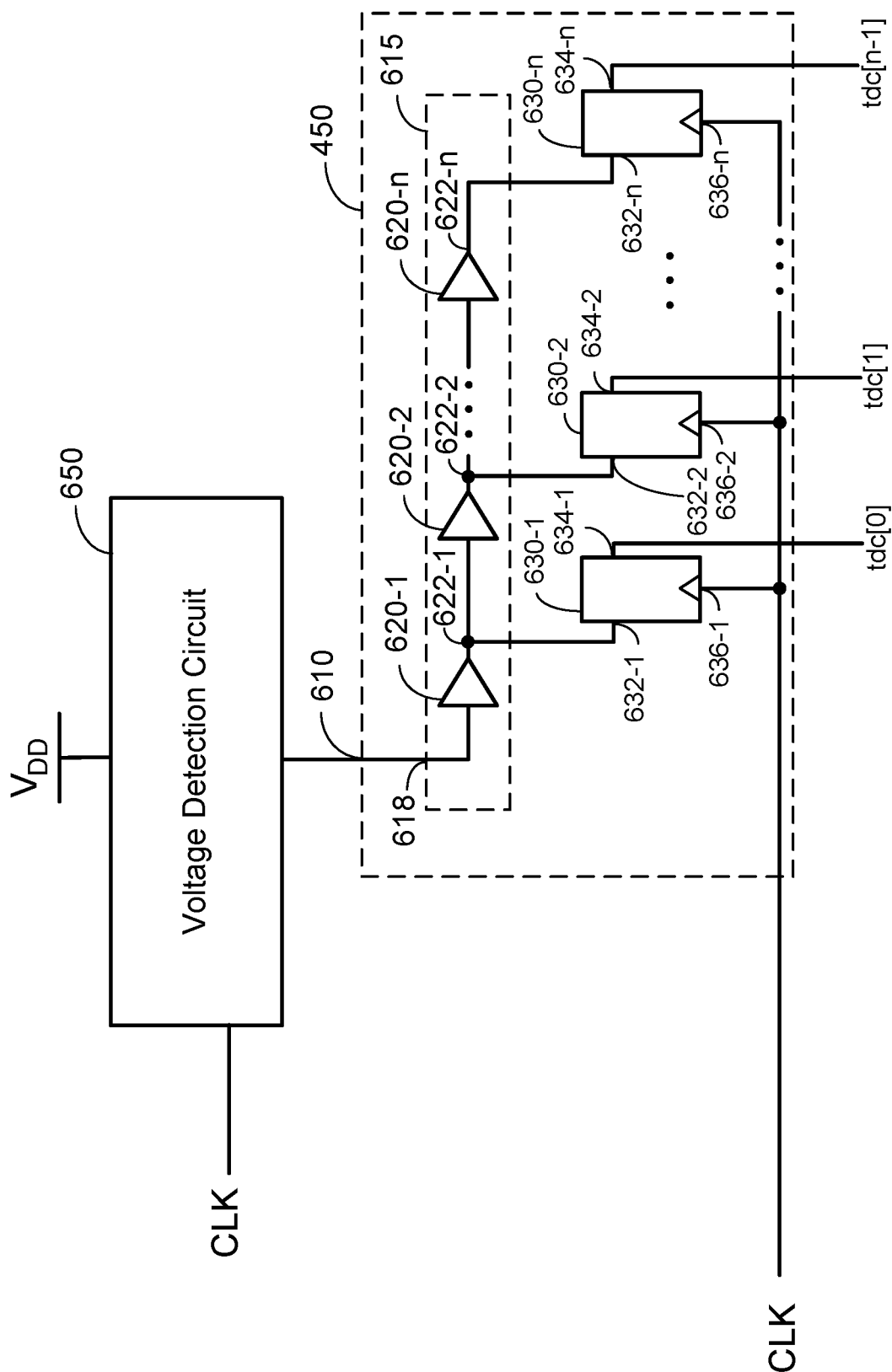
FIG. 6 shows an exemplary implementation of a timing circuit according to certain aspects of the present disclosure.

FIG. 6 shows an exemplary implementation of the timing circuit 450 according to certain aspects. In this example, the timing circuit 450 is configured to receive a timing signal at an input 610 and perform time-to-digital conversion on the timing signal to generate the timing margin signal. In this example, the timing margin signal is a digital signal including bits (labeled "tdc[0]" to "tdc[n−1]"). In other words, in this example, the timing margin signal is a digital code tdc[0:n−1] that provides a digital reading of the timing margin. As discussed further below, the timing signal may come from a voltage detection circuit 650 coupled to the timing circuit 450.

In this example, the reference signal may also be a digital code indicating the target timing margin. In one example, the digital code for the reference signal may be stored in a register 550 having an output 555 coupled to the first input 512 of the comparator 510, as shown in FIG. 5. In this example, the register 550 is configured to output the reference signal to the comparator 510 by outputting the digital code stored in the register 550 to the first input 512 of the comparator 510. In this example, the target timing margin may be programmed by writing a digital code into the register 550 corresponding to the target timing margin.

In this example, the register 550 provides the reference signal for the comparison in the voltage controller 410 using less power, area, and complexity compared with the LDOs 210 and 310. In a LDO that compares a voltage (e.g., $V_{DD}$) with a voltage reference (e.g., $V_{REF}$), an analog bandgap reference circuit is typically used to generate the voltage reference, which consumes more power and area than the register 550 and is more complicated to implement.

In the example in FIG. 6, the timing circuit 450 includes a delay line 615 and multiple flops 630-1 to 630-n coupled to the delay line 615. The flops 630-1 to 630-n are clocked by a clock signal CLK. The clock signal CLK may be the same as or different from the clock signal used to clock the comparator 510 and the switch controller 520. The delay line 615 has an input 618 coupled to the input 610 of the timing circuit 450 and multiple nodes 622-1 to 622-n where each node corresponds to a different delay along the delay line 615. In the example in FIG. 6, the delay line 615 includes multiple delay buffers 620-1 to 620-n coupled in series in which the output of each of the delay buffers 620-1 to 620-n corresponds to a respective one of the nodes 622-1 to 622-n. In operation, the timing signal received by the timing circuit 450 propagates through the delay line 615. The output of each delay buffer 620-1 to 620-n provides a different delayed-version of the timing signal at the respective node 622-1 to 622-n.

Each of the flops 630-1 to 630-n has an input 632-1 to 632-n, an output 634-1 to 634-n, and a clock input 636-1 to 636-n. The clock input 636-1 to 636-n of each flop 630-1 to 630-n is configured to receive the clock signal CLK. Each flop 630-1 to 630-n is configured to latch the bit value at the respective input 632-1 to 632-n on an edge of the clock signal CLK, and output the latched bit value at the respective output 634-1 to 634-n. The edge of the clock signal CLK may be a rising edge or a falling edge depending on whether the flops 630-1 to 630-n are implemented with rising-edge-triggered flops or falling-edge-triggered flops.

The input 632-1 to 632-n of each flop 630-1 to 630-n is coupled to a respective one of the nodes 622-1 to 622-n on the delay line 615. Thus, the input 632-1 to 632-n of each flop 630-1 to 630-n receives a different delayed-version of the timing signal. In the example in FIG. 6, the input 632-1 to 632-n of each flop 630-1 to 630-n is coupled to the output of a respective one of the delay buffers 620-1 to 620-n. The output 634-1 to 634-n of each flop 630-1 to 630-n provides a respective one of the bits (labeled "tdc[0]" to "tdc[n−1]") of the timing margin signal. In this example, each flop 630-1 to 630-n latches the bit value at the respective node 622-1 to 622-n on an edge of the clock signal CLK, and outputs the latched bit value as the bit value for the respective bit of the timing margin signal.

In this example, the outputs 634-1 to 634-n of the flops 630-1 to 630-n are coupled to the second input 514 of the comparator 510 to provide the bits (labeled "tdc[0]" to "tdc[n−1]") of the timing margin signal to the comparator 510. In one example, the outputs 634-1 to 634-n of the flops 630-1 to 630-n may be coupled to the second input 514 of the comparator 510 in parallel to provide the bits (labeled "tdc[0]" to "tdc[n−1]") to the comparator 510 in parallel. In another example, the outputs 634-1 to **634-*n* of the flops 630-1 to 630-*n* may be coupled to the second input 514 of the comparator 510 via a parallel-to-serial converter (not shown). In this example, the parallel-to-serial converter receives the bits (labeled "tdc[0]" to "tdc[n−1]") from the outputs 634-1 to 634-*n* of the flops 630-1 to 630-*n* in parallel and outputs the bits to the second input 514 of the comparator 510** serially.

In this example, the flops 630-1 to **630-*n* in the timing circuit 450 effectively provide multiple thresholds for measuring the timing margin. For example, assuming the delay of each buffer 620-1 to 620-*n* is approximately $\Delta t$, the output 634-1 of flop 630-1 indicates whether the timing margin is higher or lower than $\Delta t$, the output 634-2 of flop 630-2 indicates whether the timing margin is higher or lower than $2\Delta t$, the output 634-3 of flop 630-3 indicates whether the timing margin is higher or lower than $3\Delta t$, and so forth. The multiple thresholds provide the control circuit 435 with additional information that can be used to control the switches 420-1 to 420-N. For example, the additional information may be used to determine the magnitude of the difference between the measured timing margin and the target timing margin, the slope of the timing margin as the control circuit 435 changes the number of switches 420-1 to 420-N that are turned on, etc. In contrast, the voltage comparator 330 used by the LDO 310 in FIG. 3** simply provides information on whether the voltage $V_{DD}$ is higher or lower than the reference voltage (which effectively acts as a single voltage threshold).

In this example, the timing margin signal and the reference signal are both digital codes. This allows the comparator 510 to be implemented with a digital circuit which is easier to implement and scales better with process technology compared with the voltage comparator 330. In contrast, the voltage comparator 330 is implemented with an analog circuit that is sensitive to process variations and does not easily scale with process technology.

Figure 7:
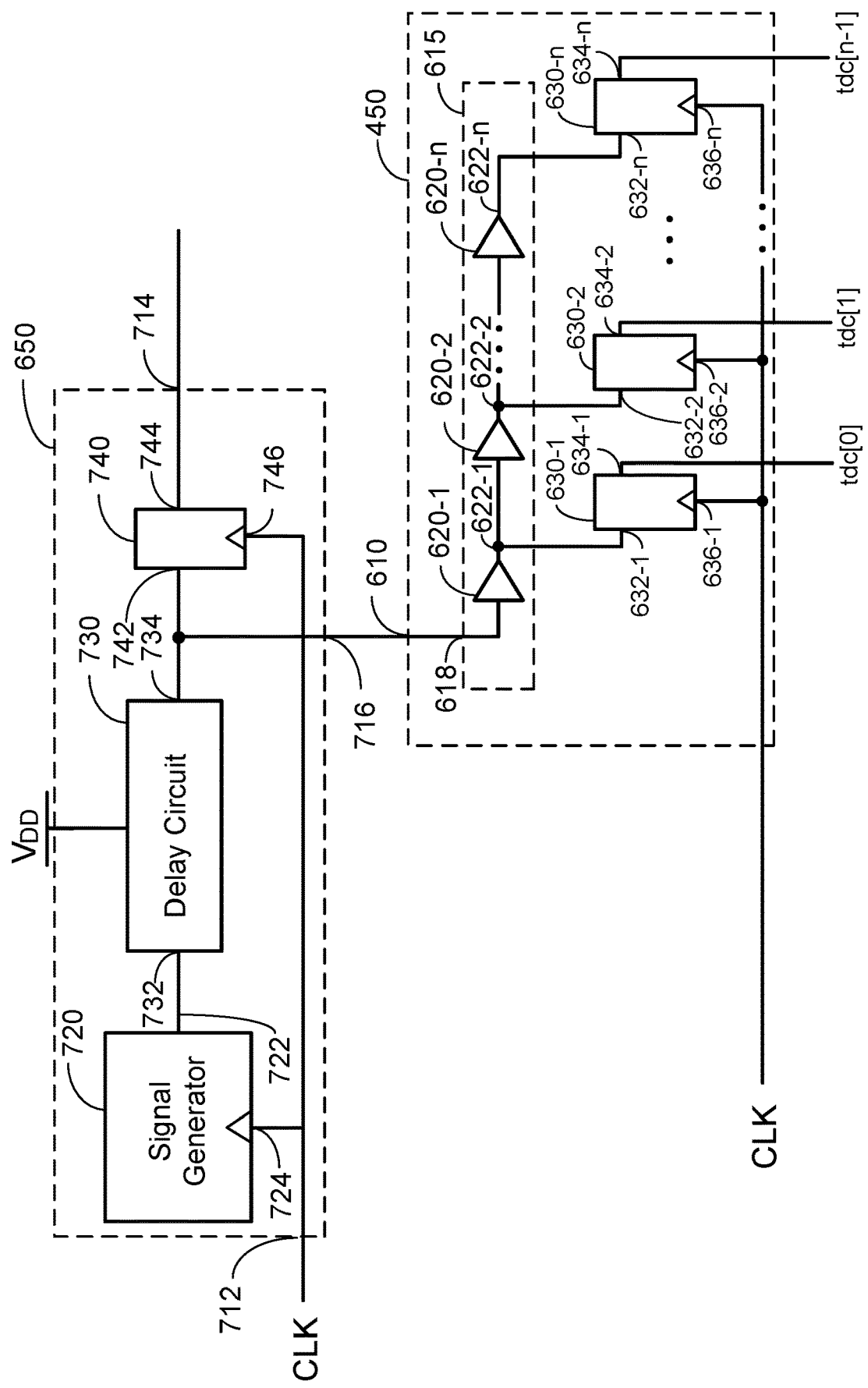
FIG. 7 shows an exemplary implementation of a voltage detection circuit according to certain aspects of the present disclosure.

FIG. 7 shows an exemplary implementation of the voltage detection circuit 650 according to certain aspects. The voltage detection circuit 650 has an input 712, a first output 714, and a second output 716. In this example, the voltage detection circuit 650 includes a signal generator 720, a delay circuit 730, and a flop 740. The delay circuit 730 may be configured such that the delay of the delay circuit 730 approximates the delay in a critical path in the circuit 460. For example, the delay circuit 730 may have a programmable delay that may be programmed to closely match the delay of the critical path in the circuit 460. In the example in FIG. 7, the delay circuit 730 is powered by the voltage $V_{DD}$ from the output 425 of the voltage controller 410 (i.e., the delay circuit 730 is coupled to the output 425 of the voltage controller 410), and therefore receives the same voltage as the circuit 460. As a result, changes in the delay of the delay circuit 730 due to changes in the voltage $V_{DD}$ track changes in the delay of the critical path in the circuit 460 due to changes in the voltage $V_{DD}$. Thus, the delay circuit 730 may be used to indirectly measure the timing margin in the critical path in the circuit 460, as discussed further below.

In this example, the signal generator 720 has an output 722 and a clock input 724. The output 722 is coupled to the input 732 of the delay circuit 730 and the clock input 724 is coupled to the input 712 of the voltage detection circuit 650, which is configured to receive the clock signal CLK. The signal generator 720 is configured to generate the timing signal which is input to the input 732 of the delay circuit 730. As discussed further below, the signal generator 720 is configured to generate an edge of the timing signal on an edge of the clock signal CLK. For example, the signal generator 720 may generate an edge of the timing signal every p cycles of the clock signal CLK where p may be one or more.

The flop 740 has an input 742, an output 744, and a clock input 746. The input 742 of the flop 740 is coupled to the output 734 of the delay circuit 730, and the clock input 746 of the flop 740 is coupled to the input 712 of the voltage detection circuit 650, which is configured to receive the clock signal CLK. The output 744 of the flop 740 is coupled to the first output 714 of the voltage detection circuit 650. As discussed further below, the flop 740 is configured to output an output signal indicating whether there is a timing error.

In operation, the signal generator 720 generates an edge of the timing signal on an edge of the clock signal CLK. The edge of the timing signal may be a rising edge or a falling edge, and the edge of the clock signal CLK may be a rising edge or a falling edge. The signal generator 720 outputs the edge of the timing signal to the input 732 of the delay circuit 730. The delay circuit 730 delays the edge of the timing signal by a delay that is matched to or closely matched to the delay of the critical path in the circuit 460, as discussed above. The delay circuit 730 outputs the edge of the timing signal after the delay at the output 734 of the delay circuit 730. The edge at the output 734 of the delay circuit 730 may have the same edge polarity as the edge at the input 732 of the delay circuit 730 or the inverse edge polarity depending on whether the delay circuit 730 inverts the polarity of the edge of the timing signal.

Figure 8:
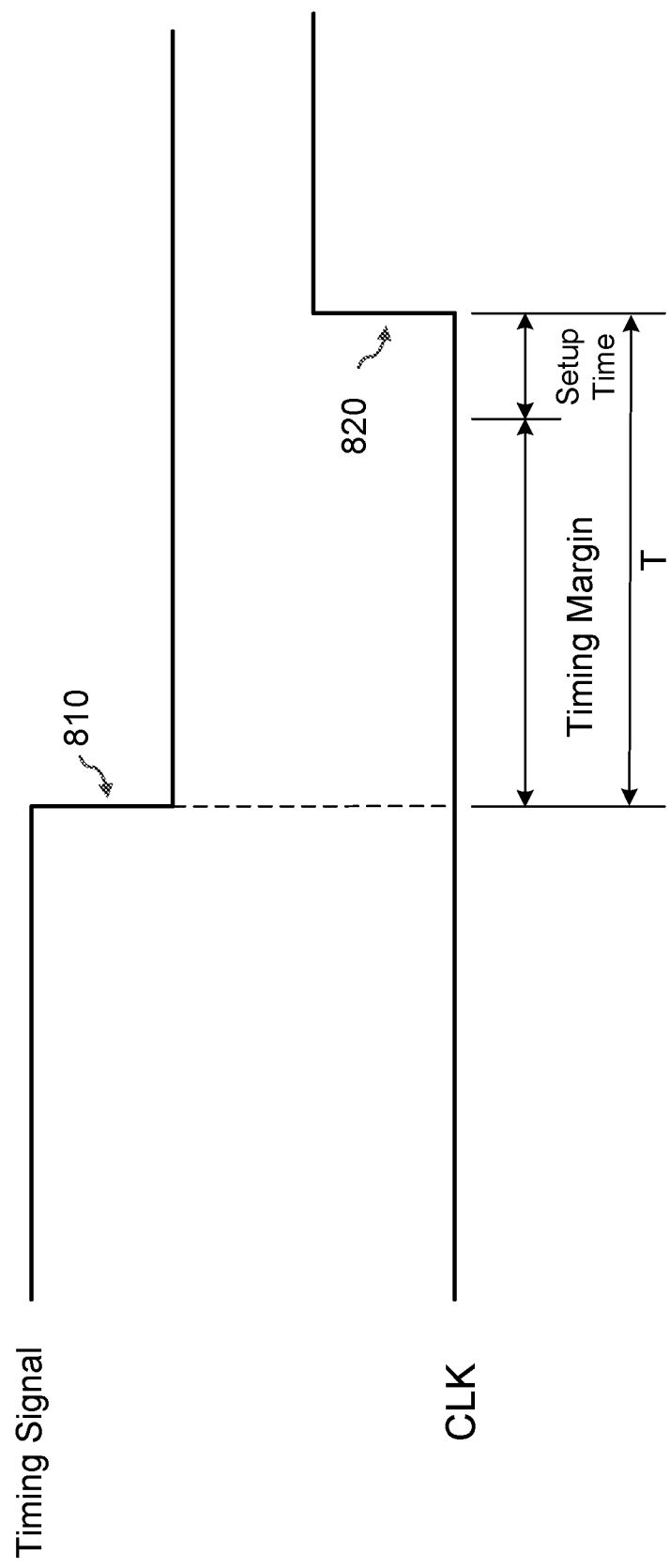
FIG. 8 is a timing diagram illustrating an example of a timing margin according to certain aspects of the present disclosure.

The flop 740 may then attempt to latch the edge of the timing signal on an edge of the clock signal CLK. The edge of the clock signal CLK used to trigger the flop 740 may be spaced apart from the edge used by the signal generator 720 to generate the edge of the timing signal by one cycle of the clock signal CLK. In this regard, FIG. 8 shows an example of the edge 810 of the timing signal at the input 742 of the flop 740 and the edge 820 of the clock signal CLK at the clock input 746 of the flop 740. In this example, the flop 740 has a setup time, which may be defined as a minimum amount of time the edge 810 of the timing signal needs to arrive at the input 742 of the flop 740 before the edge 820 of the clock signal CLK in order for the flop 740 to correctly latch the edge 810. In this example, the timing margin is approximately equal to the amount of time (labeled "T") that the edge 810 of the timing signal arrives at the input 742 of the flop 740 before the edge 820 of the clock signal CLK minus the setup time of the flop 740.

In this example, if the edge 810 of the timing signal arrives at the input 742 of the flop 740 before the start of setup time, then the flop 740 successfully latches the edge 810. This indicates that timing is met by the delay circuit 730 (i.e., no timing error). Since the delay of the delay circuit 730 closely matches the delay of the critical path in the circuit 460, this also indicates that timing is met in the critical path in the circuit 460. If the edge 810 of the timing signal arrives at the input 742 of the flop 740 after the start of the setup time, then the flop 740 fails to latch the edge 810 of the timing signal. This may indicate that timing is not met (i.e., indicate a timing error). Thus, the output 744 of the flop 740 indicates whether there is a timing error.

In certain aspects, the output of the flop 740 may be used to detect a voltage droop in the voltage $V_{DD}$. This is because a voltage droop increases the delay in the delay circuit 730, which causes the edge 810 of the timing signal to arrive at the input 742 of the flop 740 after the start of the setup time for a large enough voltage droop. In other words, a large enough voltage droop causes the flop 740 to fail to latch the edge 810 and therefore fail to output the edge 810 at the output 744, indicating a timing error. Thus, in this example, a voltage droop in the voltage $V_{DD}$ may be detected when the output 744 of the flop 740 indicates a timing error caused by the voltage droop. In other words, the detection circuit 650 detects a voltage droop based on the impact of the voltage droop on the delay of the delay circuit 730.

In this example, the output 734 of the delay circuit 730 is also coupled to the second output 716 of the voltage detection circuit 650, which is coupled to the input 610 of the timing circuit 450. Thus, in this example, the timing signal at the output 734 of the delay circuit 730 provides the timing signal that is input to the timing circuit 450. As discussed above, the timing circuit 450 is configured to convert the timing signal into the timing margin signal. In this example, the edge 810 of the timing signal is input to the delay line 615 of the timing circuit 450 after the delay of the delay circuit 730. The edge 810 of the timing signal is further delayed by the delay line 615, in which the edge is delayed by increasing delays as the edge 810 propagates down the delay line 615. The outputs of the delay buffers 620-1 to 620-n in the delay line 615 output different delayed-versions of the edge 810 to the respective flops 630-1 to 630-n. In this example, each flop 630-1 to 630-n attempts to latch the edge 810 of the timing signal from the output of the respective delay buffer 620-1 to 620-n on an edge of the clock signal CLK. The edge of the clock signal CLK used to trigger the flops 630-1 to 630-n may be the same edge of the clock signal CLK used to trigger the flop 740 in the voltage detection circuit 650.

In this example, the timing margin is indicated by the number of the flops 630-1 to 630-n in the timing circuit 450 that successfully latch the edge 810 of the timing signal. The larger the number of the flops 630-1 to 630-n that successfully latch the edge 810 of the timing signal, the larger the timing margin. A flop that successfully latches the edge outputs the latched edge 810 at the respective output. For the example where the edge 810 is a falling edge (shown in the example in FIG. 8), each flop 630-1 to 630-n that successfully latches the edge outputs a bit value of zero. For the example where the edge 810 is a rising edge, each flop 630-1 to 630-n that successfully latches the edge outputs a bit value of one. Thus, in this example, the bit values at the outputs 634-1 to 634-n of the flops 630-1 to 630-n indicate the number of the flops 630-1 to 630-n that successfully latch the edge 810 of the timing signal, which is indicative of the timing margin. As discussed above, the outputs 634-1 to 634-n of the flops 630-1 to 630-n provide the bits (labeled "tdc[0]" to "tdc[n–1]") of the timing margin signal, which are input to the second input 514 of the comparator 510 in parallel or serially.

Figure 9:
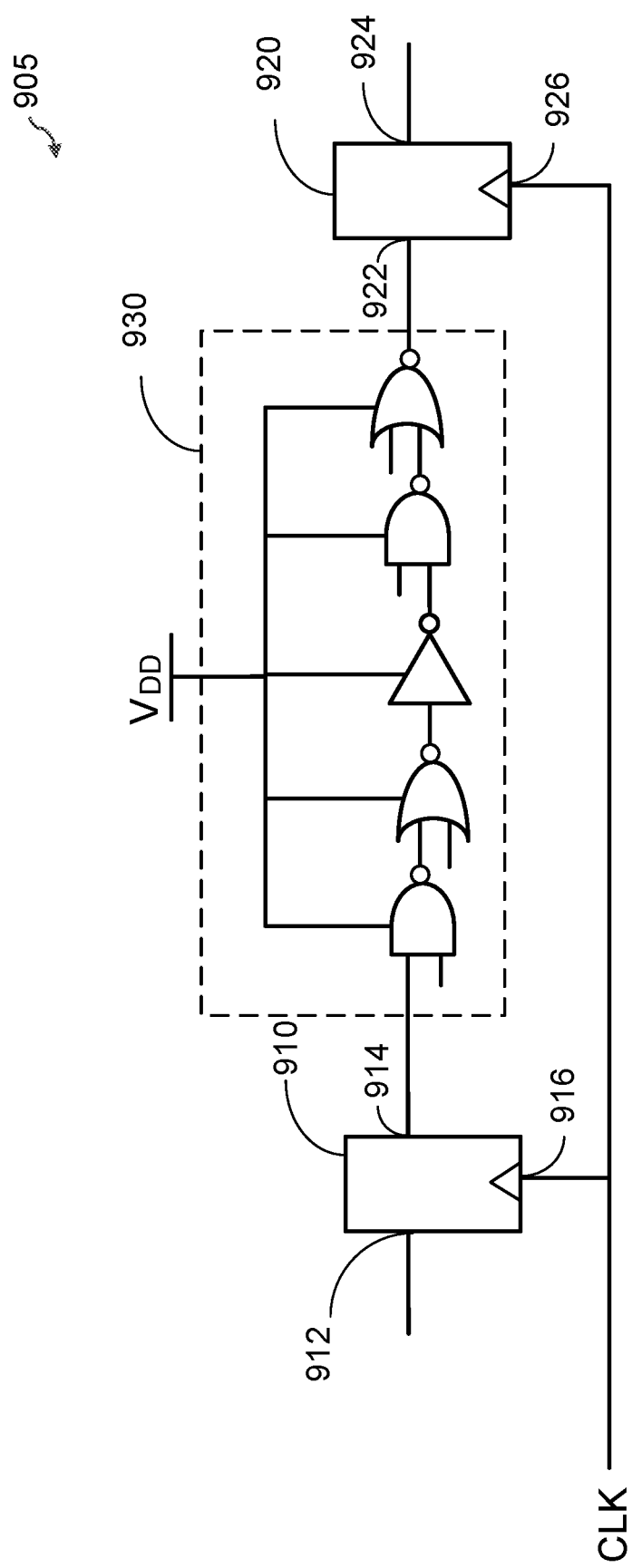
FIG. 9 shows an example of a critical path in a circuit according to certain aspects of the present disclosure.

FIG. 9 shows an example of a critical path 905 in the circuit 460 according to certain aspects. It is to be appreciated that the exemplary critical path 905 shown in FIG. 9 is for illustrative purposes and not intended to limit the present disclosure to a particular critical path. The critical path of the circuit 460 may vary, for example, depending on the implementation of the circuit 460. In one example, the circuit 460 may include multiple data paths in which one of the data paths is the critical path. In this example, the critical path may be the data path from among the multiple data paths having the smallest timing margin. The critical path 905 in the circuit may be identified, for example, by performing a timing analysis on the circuit 460 or another technique known in the art.

In the example in FIG. 9, the critical path 905 includes a first flop 910, a delay path 930, and a second flop 920. The first flop 910 has an input 912, an output 914, and a clock input 916. The input 912 of the first flop 910 is configured to receive a data signal and the clock input 916 is configured to receive a clock signal CLK. The data signal may come from another portion of the circuit 460 (not shown) or a may be a data signal that is input to the circuit 460.

The second flop 920 has an input 922, an output 924, and a clock input 926. The delay path 930 is coupled between the output 914 of the first flop 910 and the input 922 of the second flop 920. The clock input 926 of the second flop 920 is configured to receive the clock signal CLK. In operation, the delay path 930 delays the data signal from first flop 910. The output 924 of the second flop 920 may be coupled to another portion the circuit 460 or an output of the circuit 460.

The data path 930 may include logic gates and/or other devices that perform an operation (e.g., logical operation) on the data signal. FIG. 9 shows an example of various types of logic gates that may be included in the delay path 930. It is to be appreciated that the delay path 930 is not limited to the example in FIG. 9, and that the delay path 930 may include various combinations of logic gates depending on the implementation of the circuit 460. The delay path 930 delays the data signal by a delay based on, for example, the delays of the logic gates in the delay path 930 and the connections between the logic gates. As shown in FIG. 9, the voltage $V_{DD}$ of the voltage controller 410 is supplied to the logic gates in the delay path 930, and therefore the delay of the delay path 930 is sensitive to the voltage $V_{DD}$.

In operation, the first flop 910 is configured to latch a bit of the data signal on a first edge (e.g., rising edge) of the clock signal CLK and output the latched bit of the data signal at the output 914. The latched bit is input to the delay path 930. The delay path 930 generates a corresponding bit at the input 922 of the flop 920 after the delay of the delay path 930. The second flop 920 is configured to latch the bit from the delay path 930 on a second edge (e.g., rising edge) of the clock signal CLK and output the latched bit at the output 924. The first edge and the second edge of the clock signal CLK may be spaced apart by one cycle of the clock signal CLK. In this example, the timing margin of the critical path 905 may be defined as the amount of time between the second edge of the clock signal CLK and the arrival of the edge of the bit at the input 922 of the second flop 920 minus the setup time of the flop 920.

The delay of the delay circuit 730 may be programmed (i.e., tuned) to closely match the delay of the delay path 930 so that the timing margin of the voltage detection circuit 650 closely matches the timing margin of the critical path 905. Since the delay circuit 730 and the delay path 930 receive the voltage $V_{DD}$ from the voltage controller 410, the timing margin of the voltage detection circuit 650 tracks changes in the timing margin of the critical path 905 due to changes in the voltage $V_{DD}$. This allows the delay circuit 730 to indirectly measure the timing margin for the circuit 460 and hence the timing margin signal to indicate the timing margin for the circuit 460. The use of a delay circuit having a delay closely matched to the delay of the critical path to monitor the timing margin of the critical path may be referred to as critical path monitoring.

For the circuit 460 to function correctly, the timing margin of the critical path 905 needs to be equal to or greater than zero regardless of clock frequency Fclk (i.e., frequency of the clock signal) and voltage $V_{DD}$. For this reason, the timing margin signal output by the timing circuit 450 provides the control circuit 435 with a more accurate representation of the current operating condition of the circuit 460 than the voltage $V_{DD}$. When the control circuit 435 adjusts the number of switches 420-1 to 420-N that are turned on based on the timing margin signal, the timing margin signal provides the control circuit 435 with an accurate indication of the sensitivity of circuit functionality with changes in the number of switches 420-1 to 420-N that are turned on.

In contrast, in the LDO 310 in FIG. 3, the voltage $V_{DD}$ measurement provides an indirect representation of the timing margin based on silicon characterization. Determining the voltage $V_{DD}$ that corresponds to a target timing margin typically requires extensive characterizations.

The differences in these types of measurements are especially important since the sensitivity of path delay to $V_{DD}$ changes significantly across dynamic voltage-frequency scaling (DVFS) conditions. For example, the sensitivity of path delay to $V_{DD}$ increases significantly from high DVFS conditions (i.e., high $V_{DD}$ and Fclk values) to low DVFS conditions (i.e., low $V_{DD}$ and Fclk values). In addition, the sensitivity of path delay to $V_{DD}$ depends heavily on process variations. For these reasons, the acceptable $V_{DD}$ variation for an LDO (e.g., LDO 310) based on $V_{DD}$ measurements varies a lot across the DVFS conditions and process variations, which needs be extensively characterized in silicon for a given product and process technology. The voltage controller 410 according to aspects of the present disclosure avoids this characterization complexity by controlling the switches 420-1 to 420-N using timing-margin measurements instead of $V_{DD}$ measurements.

Figure 10:
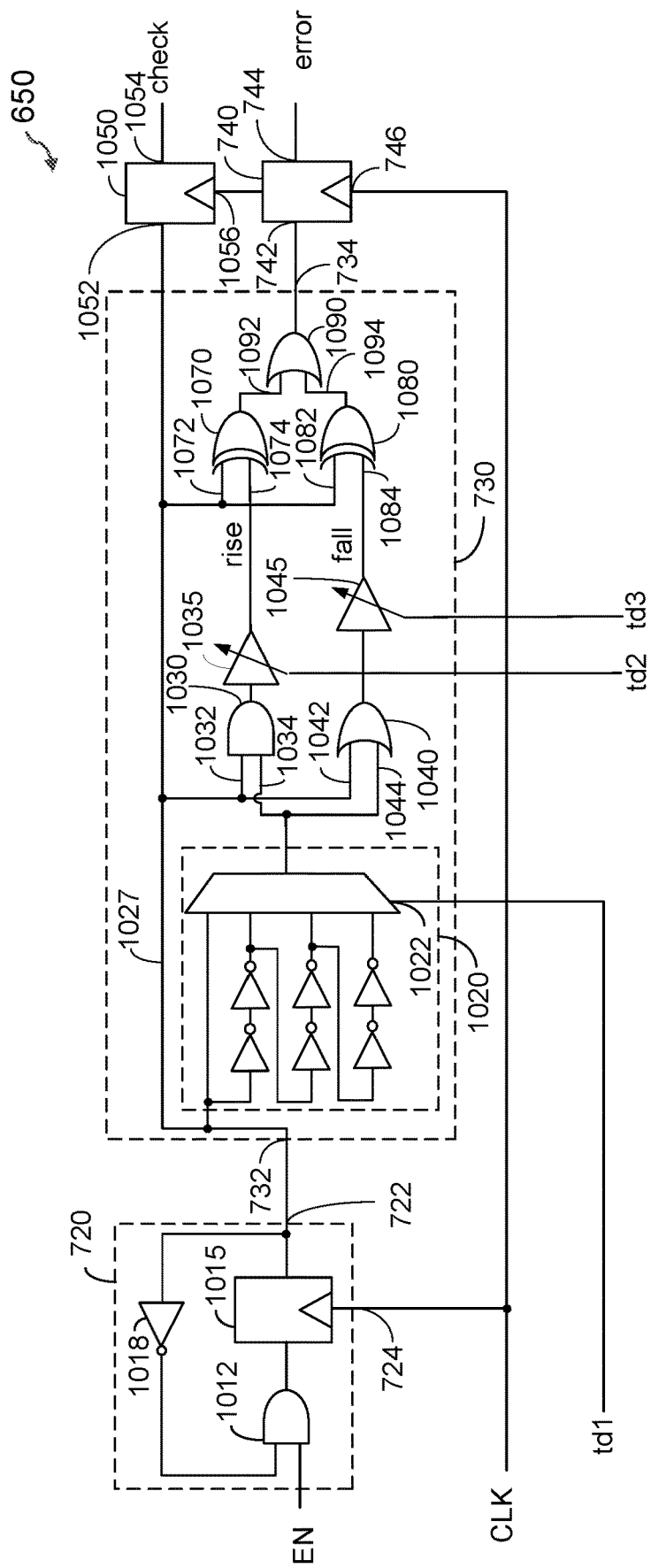
FIG. 10 shows an exemplary implementation of a signal generator and a delay circuit according to certain aspects of the present disclosure.

FIG. 10 shows an exemplary implementation of the signal generator 720 and the delay circuit 730 according to certain aspects of the present disclosure. In this example, the signal generator 720 includes a flop 1015, an inverter 1018, and an AND gate 1012. The AND gate 1012 has one input coupled to the output of the flop 1015 via the inverter 1018, another input configured to receive an enable signal EN, and an output coupled to the input of the flop 1015. The clock input of the flop 1015 is driven by the clock signal CLK. The output of the flop 1015 is coupled to the output 722 of the signal generator 720.

In operation, the signal generator 720 is enabled when the enable signal EN is one. In this case, the flop 1015 outputs a timing signal that switches logic states (toggles) on each rising edge of the clock signal CLK. Thus, in this example, the signal generator 720 alternates between outputting a rising edge and a falling edge. The signal generator 720 is disabled when the enable signal EN is zero.

In this example, the delay circuit 730 includes a fast path 1027, a tunable delay device 1020, an AND gate 1030, a first OR gate 1040, a first fine tunable delay device 1035, a second fine tunable delay device 1045, a first XOR gate 1070, a second XOR gate 1080, and a second OR gate 1090. The input of the tunable delay device 1020 is coupled to the input 732 of the delay circuit 730. The fast path 1027 bypasses the tunable delay device 1020 and has a much shorter delay than the tunable delay device 1020. The fast path 1027 is coupled to the input 732 of the delay circuit 730, as shown in FIG. 10.

A first input 1032 of the AND gate 1030 is coupled to the fast path 1027 and a second input 1034 of the AND gate 1030 is coupled to the output of the tunable delay device 1020. A first input 1042 of the first OR gate 1040 is coupled to the fast path 1027 and a second input 1044 of the first OR gate 1040 is coupled to the output of the tunable delay device 1020. A first input 1072 of the first XOR gate 1070 is coupled to the fast path 1027 and a second input 1074 of the first XOR gate 1070 is coupled to the output of the AND gate 1030 via the first fine tunable delay device 1035. A first input 1082 of the second XOR gate 1080 is coupled to the fast path 1027 and a second input 1084 of the second XOR gate 1080 is coupled to the output of the first OR gate 1040 via the second fine tunable delay device 1045. A first input 1092 of the second OR gate 1090 is coupled to the output of the first XOR gate 1070, a second input 1094 of the second OR gate 1090 is coupled to the output of the second XOR gate 1080, and the output of the second OR gate 1090 is coupled to the output 734 of the delay circuit 730.

In the example in FIG. 10, the tunable delay device 1020 includes a multiplexer 1022 and multiple selectively delay paths. In this example, the delay of the tunable delay device 1020 is programmed by programming the delay path that is selected by the multiplexer 1022 via a select signal (labeled "td1"). The output of the multiplexer 1022 is coupled to the output of the tunable delay device 1020. The select signal td1 may be a digital code indicating which one of the selectable delay paths is to be selected by the multiplexer 822. Thus, in this example, a delay of the delay circuit 730 may be programmed using the select signal td1.

Figure 11A:
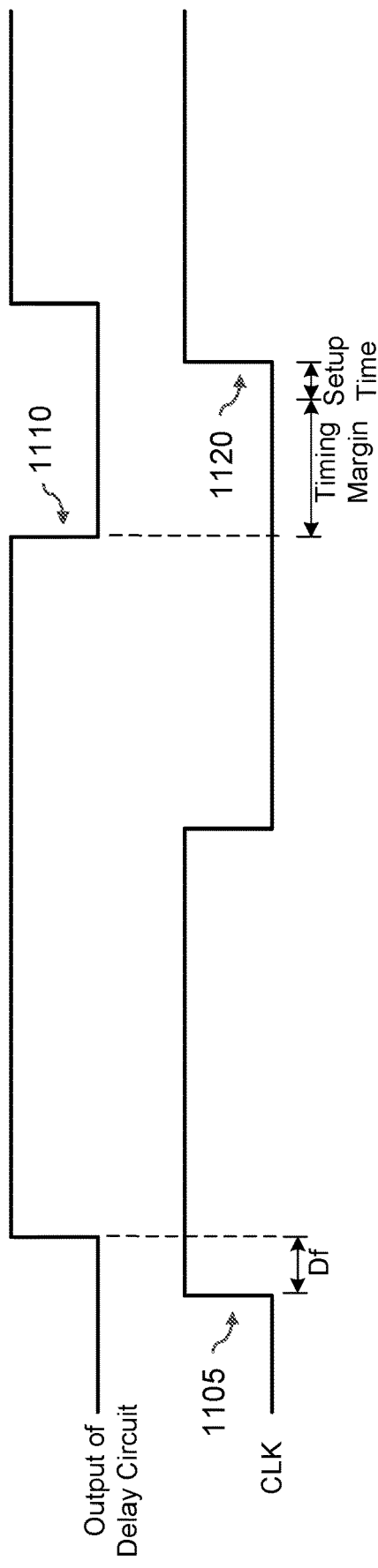
FIG. 11A is an exemplary timing diagram illustrating operation of the delay circuit according to certain aspects of the present disclosure.

Operation of the exemplary voltage detection circuit 650 illustrated in FIG. 10 will now be described according to certain aspects of the present disclosure. Operation for the example where the signal generator 720 outputs a rising edge of the timing signal is described first according to certain aspects with reference to FIG. 11A. FIG. 11A is a timing diagram showing an example of the signal at the output of the delay circuit 730.

In this example, the signal generator 720 outputs a rising edge of the timing signal on a first edge 1105 of the clock signal CLK. The rising edge of the timing signal propagates quickly from the output 722 of the signal generator 720 to the first input 1032 of the AND gate 1030 and the first input 1072 of the first XOR gate 1070 via the fast path 1027 (which bypasses the delay device 1020). The rising edge from the fast path 1027 causes the first XOR gate 1070 to output a bit value of one to the second OR gate 1090. This is because the bit value at the second input 1074 of the first XOR gate 1070 is zero since the rising edge of the timing signal is still propagating through the delay device 1020. The bit value of one output by the first XOR gate 1070 causes the second OR gate 1090 to output a bit value of one at the output 734 of the delay circuit 730. This is done to reset the output 734 of the delay circuit 730 to one. An example of this is illustrated in FIG. 11A, in which the output of the 734 of the delay circuit 730 is reset to one after a delay (labeled "Df") approximately equal to the clock-to-output ("CLK-Q") delay of the flop 1015, the delay of the fast path 1027, and the delay of the first XOR gate 1070 and the second OR gate 1090.

The rising edge of the timing signal propagates through the delay device 1020 and is output by the delay device 1020 after the delay of the delay device 1020. Thus, the rising edge is input to the second input 1034 of the AND gate 1030 after the delay of the delay device 1020, which causes the AND gate 1030 to output a rising edge. The rising edge propagates to the second input 1074 of the first XOR gate 1070 after the delay of the first fine tunable delay device 1035. This causes the first XOR gate 1070 to output a falling edge, which causes the second OR gate 1090 to output a falling edge at the output 734 of the delay circuit 730. An example of this is illustrated in FIG. 11A which shows an example of the falling edge 1110 at the output 734 of the delay circuit 730. The falling edge 1110 is delayed from the first edge 1105 of the clock signal CLK by approximately the delay of the tunable delay device 1020 and the first fine tunable delay device 1035.

In this example, timing is met when the flop 740 successfully latches the falling edge 1110 on a second edge 1120 of the clock signal CLK. Note that, in this example, the polarity of the edge of the timing signal is inverted by the delay circuit 730 (i.e., the edge 1110 at the output of the delay circuit 730 is a falling edge and the edge at the output of the signal generator 720 is a rising edge). In this example, timing is met if the flop 740 successfully latches the falling edge 1110. In this case, the flop 740 outputs a bit value of zero at the output 744 indicating that timing is met. Timing is not met if the flop 740 fails to latch the falling edge 1110. This may occur, for example, when the falling edge 1110 arrives at the input 742 of the flop 740 after the start of the setup time of the flop 740.

Figure 11B:
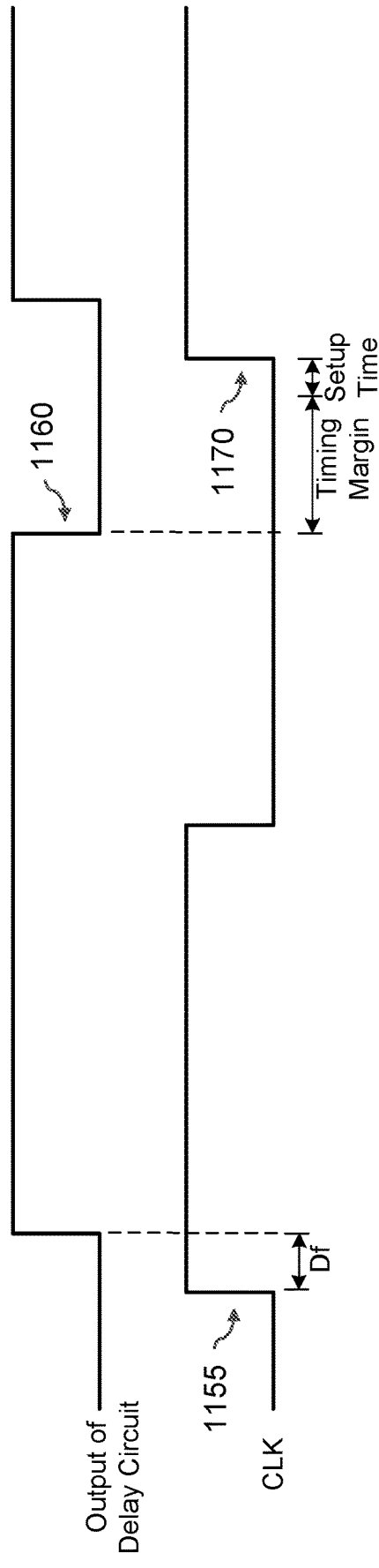
FIG. 11B is another exemplary timing diagram illustrating operation of the delay circuit according to certain aspects of the present disclosure.

Operation for the example where the signal generator 720 outputs a falling edge of the timing signal will now be described according to certain aspects with reference to FIG. 11B. FIG. 11B is a timing diagram showing an example of the signal at the output of the delay circuit 730.

In this example, the signal generator 720 outputs a falling edge of the timing signal on a first edge 1155 of the clock signal CLK. The falling edge of the timing signal propagates quickly from the output 722 of the signal generator 720 to the first input 1042 of the first OR gate 1040 and the first input 1082 of the second XOR gate 1080 via the fast path 1027 (which bypasses the delay device 1020). The falling edge from the fast path 1027 causes the second XOR gate 1080 to output a bit value of one to the second OR gate 1090. This is because the bit value at the second input 1084 of the second XOR gate 1080 is still one since the falling edge of the timing signal is still propagating through the delay device 1020. The bit value of one output by the second XOR gate 1080 causes the second OR gate 1090 to output a bit value of one at the output 734 of the delay circuit 730. This is done to reset the output 734 of the delay circuit 730 to one. An example of this is illustrated in FIG. 11B, in which the output of the 734 of the delay circuit 730 is reset to one after a delay (labeled "Df") approximately equal to the CLK-Q delay of the flop 1015, the delay of the fast path 1027, and the delay of the second XOR gate 1080 and the second OR gate 1090.

The falling edge of the timing signal propagates through the delay device 1020 and is output by the delay device 1020 after the delay of the delay device 1020. Thus, the falling edge is input to the second input 1044 of the first OR gate 1040 after the delay of the delay device 1020, which causes the first OR gate 1040 to output a falling edge. The falling edge propagates to the second input 1084 of the second XOR gate 1080 after the delay of the second fine tunable delay device 1045. This causes the second XOR gate 1080 to output a falling edge, which causes the second OR gate 1090 to output a falling edge at the output 734 of the delay circuit 730. An example of this is illustrated in FIG. 11B which shows an example of the falling edge 1160 at the output 734 of the delay circuit 730. The falling edge 1160 is delayed from the first edge 1155 of the clock signal CLK by approximately the delay of the tunable delay device 1020 and the second fine tunable delay device 1045.

In this example, timing is met when the flop 740 successfully latches the falling edge 1160 on a second edge 1170 of the clock signal CLK. Note that, in this example, the edge of the timing signal has the same polarity (i.e., falling) at the output of the delay circuit 730 and the output of the signal generator 720. In this example, timing is met if the flop 740 successfully latches the falling edge 1160. In this case, the flop 740 outputs a bit value of zero at the output 744 indicating that timing is met. Timing is not met if the flop 740 fails to latch the falling edge 1160.

Thus, in this example, the edge of the timing signal at the output 734 of the delay circuit 730 used to determine whether timing is met is a falling edge regardless of whether the signal generator 720 outputs a rising edge or a falling edge. For the case where the signal generator 720 outputs a rising edge, the edge propagates through the tunable delay device 1020 and the first fine tunable delay device 1035. For the case where the signal generator 720 outputs a falling edge, the edge propagates through the tunable delay device 1020 and the second fine tunable delay device 1045. Thus, in this example, the first fine tunable delay device 1035 and the second fine tunable delay device 1045 allow the delay for a rising edge and the delay for a falling edge to be finely tuned separately. In the example in FIG. 10, the delay of the first fine tunable delay device 1035 is set by control signal td2 and the delay of the second fine tunable delay device 1045 is set by control signal td3.

In the example in FIG. 10, the voltage detection circuit 650 also includes a check flop 1050 having an input 1052 coupled to the output of the signal generator 720 via the fast path 1027, a clock input 1056 configured to receive the clock signal CLK, and an output 1054. In operation, the check flop 1050 is configured to latch the timing signal propagating through the fast path 1027 on a rising edge of the clock signal CLK and output the latched timing signal at the output 1054. The output 1054 of the check flop 1050 provides a check signal indicating whether the signal generator 720 is operating correctly. For the example where the signal generator 720 alternately outputs rising and falling edges on rising edges of the clock signal CLK, the output 1054 of the check flop 1050 toggles between one and zero when the signal generator 720 is operating correctly.

In the exemplary implementation illustrated in FIG. 10, the edge of the timing signal used for determining whether timing is met is a falling edge. However, it is to be appreciated that, in other implementations, the edge of the timing signal used for determining whether timing is met may be a rising edge. For example, an inverter may be coupled between the output of the second OR gate 1090 and the output 734 of the delay circuit 730, in which case the edge of the timing signal used for determining whether timing is met is a rising edge.

Figure 12:
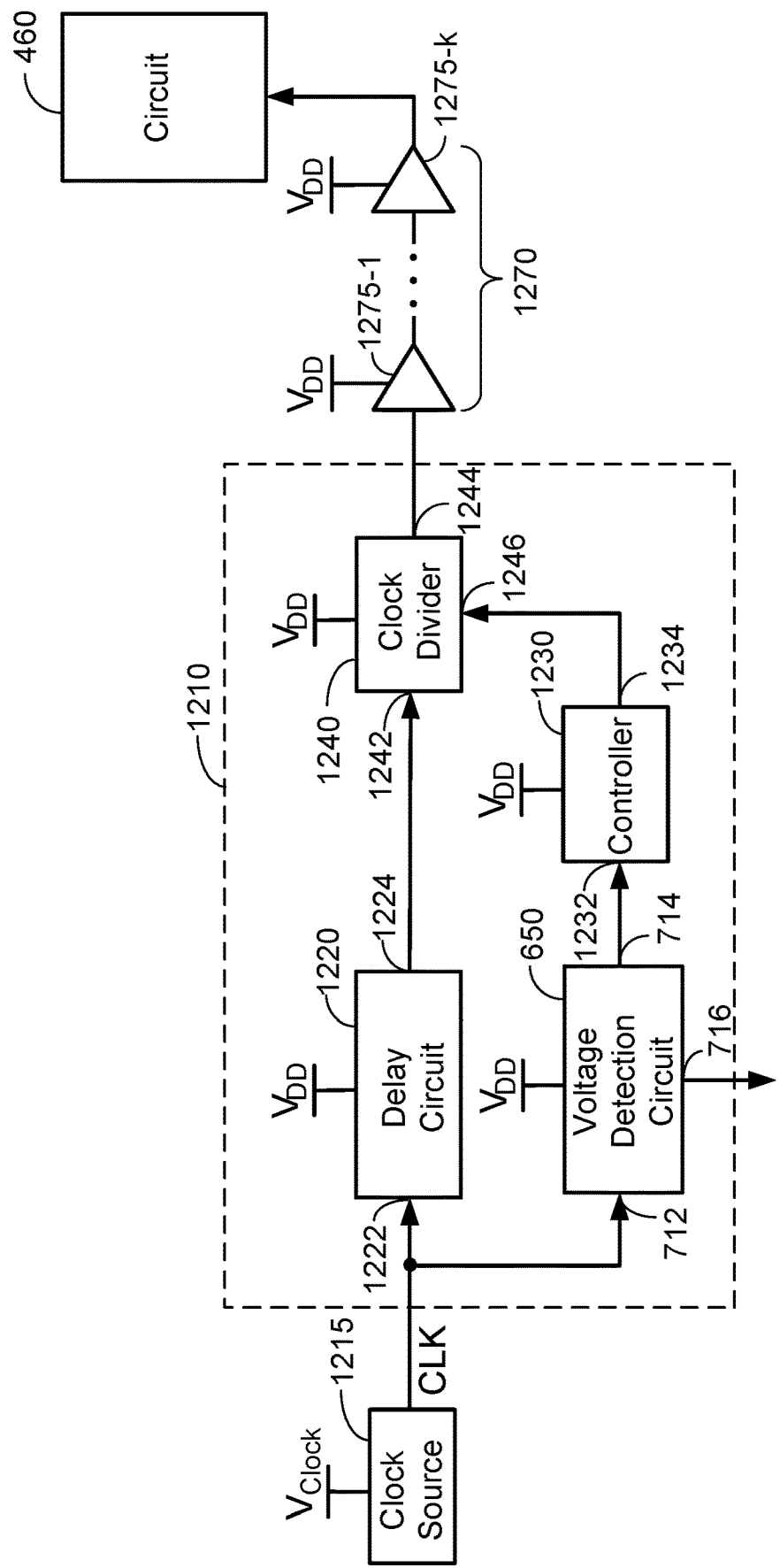
FIG. 12 shows an example of a droop mitigation circuit including the voltage detection circuit according to certain aspects of the present disclosure.

FIG. 12 shows an example of a voltage droop mitigation circuit 1210 ("droop mitigation circuit" for short) that may be used with the voltage controller 410 according to certain aspects. As discussed further below, the droop mitigation circuit 1210 relaxes the transient response time of the voltage controller 410. As a result, a relatively slow transient response time of the voltage controller 410 (e.g., compared with an analog LDO regulator) is not an issue as with a traditional digital LDO regulator (e.g., digital LDO regulator 310). Note that the timing circuit 450, the comparator 510, the switch controller 520, and the switches 420-1 to 420-N are not shown in FIG. 12 for ease of illustration.

In the example in FIG. 12, the droop mitigation circuit 1210 includes the voltage detection circuit 650, a delay circuit 1220, a clock controller 1230, and a clock divider 1240. The delay circuit 1220 has an input 1222 and an output 1224. The delay circuit 1220 may include multiple delay buffers (not shown) coupled in series in which the delay buffers are powered by the voltage $V_{DD}$. As a result, the delay of the delay circuit 1220 is affected by (i.e., sensitive to) the voltage $V_{DD}$. The input 1222 of the delay circuit 1220 is configured to receive the clock signal CLK.

In the example in FIG. 12, the clock signal CLK is generated by a clock source 1215 coupled to the input 1222 of the delay circuit 1220. The clock source 1215 may be implemented with a phased locked loop (PLL), a delay locked loop (DLL), an oscillator, or any combination thereof. The clock source 1215 is powered by a separate voltage $V_{Clock}$ so that a voltage droop in the voltage $V_{DD}$ does not affect the clock source 1215. In the example in FIG. 12, the input 712 of the voltage detection circuit 650 is coupled to the clock source 1215 to receive the clock signal CLK from the clock source 1215.

The clock divider 1240 has a clock input 1242, a clock output 1244, and a control input 1246. The clock input 1242 is coupled to the output 1224 of the delay circuit 1220 and is configured to receive the clock signal CLK delayed by the delay circuit 1220. The clock divider 1240 is configured to selectively divide the frequency of the clock signal CLK under the control of the controller 1230. The output 1244 of the clock divider 1240 is coupled to the circuit 460 via a clock path 1270. The clock path 1270 is a path that provides a clock signal to the circuit 460 and may also be referred to as a clock distribution or another term. In the example in FIG. 12, the clock path 1270 includes one or more delay buffers 1275-1 to 1275-k coupled in series and powered by the voltage $V_{DD}$. Thus, in this example, the clock signal CLK is provided to the circuit 460 via the delay circuit 1220 and the clock path 1270. The circuit 460 uses the clock signal CLK to time operations of the circuit 460 (e.g., CPU core). For the example, the clock signal CLK may be provided to the flops 910 and 920 in the exemplary critical path 905 shown in the example in FIG. 9 via the clock path 1270.

The controller 1230 has an input 1232 and an output 1234. The input 1232 of the controller 1230 is coupled to the first output 714 of the voltage detection circuit 650. As discussed above, the voltage detection circuit 650 may be used to detect a voltage droop in voltage $V_{DD}$ based on a timing error caused by the voltage droop. In this example, the controller 1230 may monitor the output signal at the first output 714 of the voltage detection circuit 650 for detection of a voltage droop by the voltage detection circuit 650. The output 1234 of the controller 1230 is coupled to the control input 1246 of the clock divider 1240. The controller 1230 controls the clock divider 1240 via the control input 1246, as discussed further below.

When the voltage detection circuit 650 detects a voltage droop in the voltage $V_{DD}$ (e.g., outputs a timing error signal due to the voltage droop), the controller 1230 instructs the clock divider 1240 to temporarily reduce the frequency of the clock signal to the circuit 460 by dividing the frequency of the clock signal CLK. The reduction in the frequency of the clock signal prevents the voltage droop from causing timing errors in the circuit 460. For example, the frequency-divided clock signal may be provided to the flops 910 and 920 in the exemplary critical path 905 shown in FIG. 9 via the clock path 1270, and prevent a timing error in the critical path 905 due to the voltage droop. The voltage droop may be caused by an abrupt increase in the current consumption of the circuit 460 or another cause.

Thus, in this example, the controller 1230 performs droop mitigation in response to detection of a voltage droop by the voltage detection circuit 650 by instructing the clock divider 1240 to divide the frequency of the clock signal. For example, the clock divider 1240 may reduce the clock frequency by half or another amount when instructed to reduce the clock frequency by the controller 1230. When a voltage droop is no longer detected, the controller 1230 may instruct the clock divider 1240 to pass the clock signal to the circuit 460 without frequency division. In this case, the clock frequency at the circuit 460 may be the same as the clock frequency at the output of the clock source 1215.

For droop mitigation to be effective, the droop mitigation circuit 1210 needs to respond to a voltage droop before the voltage droop negatively impacts the circuit 460. In this regard, the delay circuit 1220 and the clock path 1270 delay (i.e., postpone) the impact of the voltage droop on the circuit 460 to provide the droop mitigation circuit 1210 with enough time to respond to the voltage droop. This is because the clock pulses in the delay circuit 1220 and the clock path 1270 at the time of the voltage droop are stretched due to the drop in the voltage $V_{DD}$. This effectively reduces the frequency of the clock signal input to the circuit 460 for multiple clock cycles, which provides the droop mitigation circuit 1210 with enough time to detect the voltage droop and reduce the frequency of the clock signal using the clock divider 1240 to mitigate the droop. Thus, the delay circuit 1220 and the clock path 1270 relax the transient response time of the droop mitigation circuit 1210.

Because the droop mitigation circuit 1210 mitigates the impact of a voltage droop on the circuit 460, the voltage controller 410 is not required to respond quickly to the voltage droop. As a result, a relatively slow transient response time of the voltage controller 410 (e.g., compared with an analog LDO) is not an issue as with a traditional digital LDO (e.g., digital LDO 310). For this reason, the droop mitigation circuit 1210 allows the voltage controller 410 to retain benefits of a digital LDO while specifically addressing the problem of a slow transient response time.

It is to be appreciated that the present disclosure is not limited to the exemplary droop mitigation circuit 1210 shown in FIG. 12. Other droop mitigation circuits may also be used to mitigate voltage droop to address the relatively slow transient response time of the voltage controller 410.

It is also to be appreciated that the timing margin of the voltage detection circuit 650 may be set slightly smaller (e.g., one to 20 percent smaller) than the timing margin of the critical path 905 in the circuit 460. This may be done, for example, so that a timing error occurs in the voltage detection circuit 650 before the critical path 905, which gives the droop mitigation circuit 1210 time to respond to a detected voltage droop before the droop causes an timing error in the critical path 905. The timing margin of the voltage detection circuit 650 may be set slightly smaller than the timing margin of the critical path 930 in the circuit 460 by programming the delay of the delay circuit 730 to be slightly longer (e.g., one to 20 percent longer) than the delay of the delay path 930 in the critical path 905. In this example, the timing margin signal indicates a timing margin that is slightly smaller than the timing margin of the critical path in the circuit 460.

In general, it is to be appreciated that the timing margin signal may indicate a timing margin that is slightly smaller than the actual timing margin for the circuit 460 in any one the exemplary implementations discussed above with reference to FIGS. 4 to 12. This may be done, for example, to help ensure that a timing error does not occur in the critical path of the circuit 460. As discussed above, the timing margin of the voltage detection circuit 650 may be set slightly smaller than the timing margin of the critical path 930 in the circuit 460 by programming the delay of the delay circuit 730 to be slightly longer (e.g., one to 20 percent longer) than the delay of the delay path 930 in the critical path 905.

Figure 13:
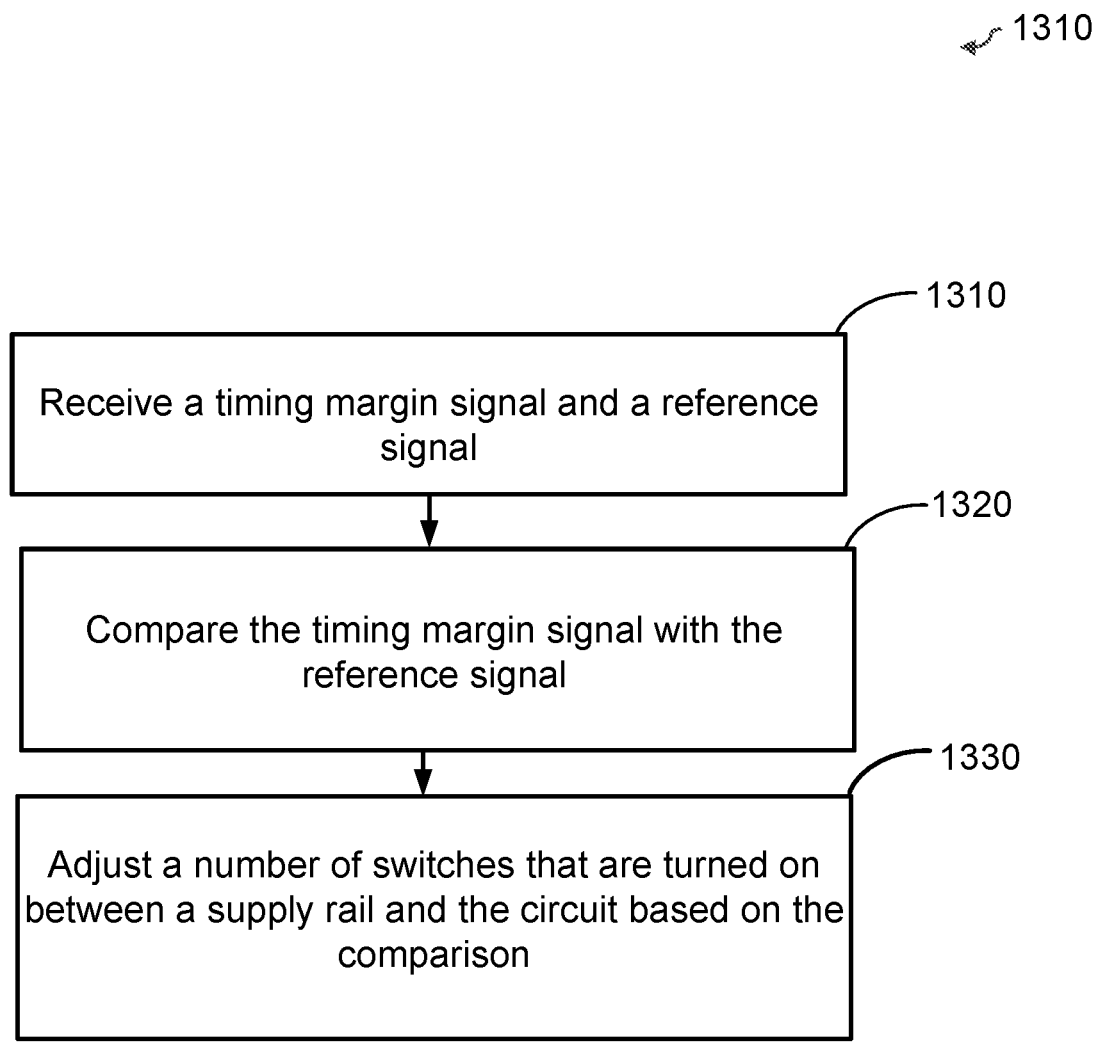
FIG. 13 is a flowchart illustrating an example of a method for controlling a voltage according to certain aspects of the present disclosure.

FIG. 13 illustrates an example of a method 1300 for controlling a voltage of a circuit according to certain aspects. The circuit (e.g., circuit 460) may include a CPU core (e.g., one of the CPU cores 130-1 to 130-4), a digital signal processor, a video processor, or another type of processor.

At block 1310, a timing margin signal and a reference signal are received. For example, the timing margin signal and the reference signal may be received at the comparator 510. The reference signal may indicate a target timing margin, and the timing margin signal may indicate a timing margin for the circuit.

At block 1320, the timing margin signal is compared with the reference signal. For example, the comparator 510 may compare the timing margin signal with the reference signal.

At block 1330, a number of switches that are turned on between a supply rail and the circuit is adjusted based on the comparison. For example, the switch controller 520 may adjust the number of switches that are turned on based on the comparison. The switches may correspond to switches 420-1 to 420-N where each switch is coupled between the supply rail and the circuit.

In certain aspects, adjusting the number of switches that are turned on may include increasing the number of switches that are turned on between the supply rail and the circuit if the timing margin signal is less than the reference signal. In certain aspects, adjusting the number of switches that are turned on may include decreasing the number of switches that are turned on between the supply rail and the circuit if the timing margin signal is greater than the reference signal.

In certain aspects, the method 1300 may also include generating the timing margin signal, wherein the generating the timing margin signal includes performing time-to-digital conversion on a timing signal. In one example, the method 1300 may further include receiving the timing signal from a voltage detection circuit (e.g., voltage detection circuit 650). In this example, the voltage detection circuit may be configured to detect a voltage droop (e.g., a droop in the voltage $V_{DD}$).

The control circuit 435, the comparator 510, the switch controller 520, and the controller 1230 may each be implemented with a processor, a state machine, an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

It is to be appreciated that the present disclosure is not limited to the exemplary terminology used above to describe aspects of the present disclosure. For example, the controller 1230 may also be referred to as an adaptive control unit (ACU) or another term. A rising edge may also be referred to as a rising transition, a positive edge, or another term. A falling edge may also be referred to as a falling transition, a negative edge, or another term. A timing error may also be referred to as a timing failure, a timing violation, or another term.

Implementation examples are described in the following numbered clauses:

1. A system, comprising:
    a voltage controller, wherein the voltage controller includes:
        switches coupled between a voltage supply rail and an output of the voltage controller, each of the switches having a control input; and
        a control circuit coupled to the control inputs of the switches; and
    a timing circuit coupled to the control circuit, wherein the timing circuit includes:
        a delay line; and
        flops, each of the flops having an input and an output, wherein the input of each of the flops is coupled to a respective node on the delay line, and the outputs of the flops are coupled to the control circuit.
2. The system of clause 1, wherein each of the switches comprises a respective transistor, and the control input of each of the switches is located at a gate of the respective transistor.
3. The system of clause 1 or 2, wherein the delay line comprises multiple delay buffers coupled in series.
4. The system of clause 3, wherein the input of each of the flops is coupled to an output of a respective one of the delay buffers.
5. The system of any one of clause 1 to 4, further comprising a voltage detection circuit coupled to the delay line.
6. The system of clause 5, wherein the voltage detection circuit comprises:
    a signal generator; and
    a delay circuit having an input and an output, wherein the input of the delay circuit is coupled to the signal generator, and the output of the delay circuit is coupled to the delay line.
7. The system of clause 6, wherein the signal generator is configured to generate a timing signal, and output the timing signal to the input of the delay circuit.
8. The system of clause 7, wherein the signal generator is configured to generate an edge of the timing signal on a first edge of a clock signal, and output the edge of the timing signal to the input of the delay circuit.
9. The system of clause 8, wherein each of the flops is configured to latch a bit value at the input of the flop on a second edge of the clock signal, and output the latched bit value at the output of the flop.
10. The system of clause 9, wherein the first edge of the clock signal and the second edge of the clock signal are spaced apart by one cycle of the clock signal.
11. The system of any one of clauses 1 to 9, wherein the control circuit comprises:
    a switch controller coupled to the control inputs of the switches; and
    a comparator having a first input, a second input, and an output, wherein the output of the comparator is coupled to the switch controller, the first input is configured to receive a reference signal, and the second input is coupled to the outputs of the flops.
12. The system of clause 11, wherein the reference signal comprises a digital code.
13. The system of clause 12, further comprising a register coupled to the first input of the comparator, wherein the register is configured to store the digital code.
14. The system of any one of clauses 1 to 13, further comprising:
    a clock source;
    a clock divider;
    a delay circuit coupled between the clock source and the clock divider;

a voltage detection circuit coupled to the delay line; and
a clock controller coupled between the voltage detection circuit and a control input of the clock divider.

15. The system of clause 14, wherein the clock source comprises a phase locked loop (PLL).

16. The system of clause 14 or 15, wherein the voltage detection circuit is configured to detect a voltage droop.

17. The system of clause 16, wherein:
the clock source is configured to output a clock signal to the delay circuit; and
the clock controller is configured to instruct the clock divider to divide a frequency of the clock signal in response to detection of a voltage droop by the voltage detection circuit.

18. The system of any one of clauses 14 to 17, further comprising:
a processor coupled to the output of the voltage controller; and
a clock path coupled between the clock divider and the processor.

19. A method for controlling a voltage of a circuit, comprising:
receiving a timing margin signal and a reference signal;
comparing the timing margin signal with the reference signal; and
adjusting a number of switches that are turned on between a supply rail and the circuit based on the comparison.

20. The method of clause 19, wherein adjusting the number of switches that are turned on comprises increasing the number of switches that are turned on between the supply rail and the circuit if the timing margin signal is less than the reference signal.

21. The method of clause 20, wherein adjusting the number of switches that are turned on comprises decreasing the number of switches that are turned on between the supply rail and the circuit if the timing margin signal is greater than the reference signal.

22. The method of any one of clauses 19 to 21, further comprising generating the timing margin signal, wherein the generating the timing margin signal comprises performing time-to-digital conversion on a timing signal.

23. The method of clause 22, further comprising receiving the timing signal from a voltage detection circuit.

24. The method of clause 23, wherein the voltage detection circuit is configured to detect a voltage droop.

25. The method of clause 24, further comprising reducing a frequency of a clock signal to the processor in response to detection of the voltage droop by the voltage detection circuit.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "approximately", as used herein with respect to a stated value or a property, is intended to indicate being within 10% of the stated value or property.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system, comprising:
a voltage droop mitigation circuit having a voltage detection circuit; and
a voltage controller, wherein the voltage controller includes:
switches coupled between a voltage supply rail and an output of the voltage controller, each of the switches having a control input; and
a control circuit coupled to the control inputs of the switches; and
a timing circuit coupled to the control circuit, wherein the timing circuit includes:
a delay line coupled to the voltage detection circuit; and
flops, each of the flops having an input and an output, wherein the input of each of the flops is coupled to a respective node on the delay line, and the outputs of the flops are coupled to the control circuit.

2. The system of claim 1, wherein each of the switches comprises a respective transistor, and the control input of each of the switches is located at a gate of the respective transistor.

3. The system of claim 1, wherein the delay line comprises multiple delay buffers coupled in series.

4. The system of claim 3, wherein the input of each of the flops is coupled to an output of a respective one of the delay buffers.

5. The system of claim 1, wherein the voltage droop mitigation circuit further comprises:
a clock divider;
a first delay circuit coupled between a clock source and the clock divider; and
a clock controller coupled between the voltage detection circuit and a control input of the clock divider.

6. The system of claim 5, wherein the voltage detection circuit comprises:
a signal generator;
a second delay circuit having an input and an output, wherein the input of the second delay circuit is coupled to the signal generator, and the output of the second delay circuit is coupled to the delay line; and
a detection flop having an input and an output, wherein the input of the detection flop is coupled to the output of the second delay circuit, and the output of the detection flop is coupled to the clock controller.

7. The system of claim 6, wherein the signal generator is configured to generate a timing signal, and output the timing signal to the input of the second delay circuit.

8. The system of claim 7, wherein the signal generator is coupled to the clock source, and the signal generator is configured to generate an edge of the timing signal on a first edge of a clock signal from the clock source, and output the edge of the timing signal to the input of the second delay circuit.

9. The system of claim 8, wherein each of the flops in the timing circuit is configured to latch a bit value at the input of the flop on a second edge of the clock signal, and output the latched bit value at the output of the flop.

10. The system of claim 9, wherein the first edge of the clock signal and the second edge of the clock signal are spaced apart by one cycle of the clock signal.

11. The system of claim 1, wherein the control circuit comprises:
a switch controller coupled to the control inputs of the switches; and
a comparator having a first input, a second input, and an output, wherein the output of the comparator is coupled to the switch controller, the first input is configured to receive a reference signal, and the second input is coupled to the outputs of the flops.

12. The system of claim 11, wherein the reference signal comprises a digital code.

13. The system of claim 12, further comprising a register coupled to the first input of the comparator, wherein the register is configured to store the digital code.

14. The system of claim 5, wherein the clock source comprises a phase locked loop (PLL).

15. The system of claim 5, wherein the voltage detection circuit is configured to detect a voltage droop.

16. The system of claim 15, wherein:
the clock source is configured to output a clock signal to the first delay circuit; and
the clock controller is configured to instruct the clock divider to divide a frequency of the clock signal in response to detection of the voltage droop by the voltage detection circuit.

17. The system of claim 5, further comprising:
a processor coupled to the output of the voltage controller; and
a clock path coupled between the clock divider and the processor.

18. The system of claim 6, wherein:
the clock source is configured to output a clock signal to the first delay circuit; and
the clock controller is configured to instruct the clock divider to divide a frequency of the clock signal based on the output of the detection flop.

19. The system of claim 18, wherein the detection flop is configured to latch a bit value at the input of the detection flop on an edge of the clock signal, and output the latched bit value at the output of the detection flop.

20. A method for controlling a voltage of a circuit, comprising:
receiving a timing signal from a voltage detection circuit, wherein the voltage detection circuit is configured to detect a voltage droop;
performing time-to-digital conversion on the timing signal to generate a timing margin signal;
receiving the timing margin signal and a reference signal;
comparing the timing margin signal with the reference signal;
adjusting a number of switches that are turned on between a supply rail and the circuit based on the comparison; and
reducing a frequency of a clock signal in response to detection of the voltage droop by the voltage detection circuit.

21. The method of claim 20, wherein adjusting the number of switches that are turned on comprises increasing the number of switches that are turned on between the supply rail and the circuit if the timing margin signal is less than the reference signal.

22. The method of claim 21, wherein adjusting the number of switches that are turned on comprises decreasing the number of switches that are turned on between the supply rail and the circuit if the timing margin signal is greater than the reference signal.

23. The method of claim 20, wherein the voltage detection circuit includes a delay circuit, and the method further comprises:
generating the timing signal; and
propagating the timing signal through the delay circuit;
wherein receiving the timing signal from the voltage detection circuit comprises receiving the timing signal from an output of the delay circuit.

24. The method of claim 23, wherein the voltage detection circuit includes a flop coupled to the output of the delay circuit, and the method further comprises:
latching the timing signal on an edge of the clock signal using the flop; and
detecting the voltage droop based on an output of the flop.

* * * * *